US007501835B2

(12) United States Patent
Fujiyoshi et al.

(10) Patent No.: US 7,501,835 B2
(45) Date of Patent: Mar. 10, 2009

(54) DISPLACEMENT SENSOR

(75) Inventors: Motohiro Fujiyoshi, Seto (JP); Yutaka Nonomura, Nagoya (JP); Hisayoshi Sugihara, Aichi-ken (JP)

(73) Assignees: Kabushiki Kaisha Toyota Chuo Kenkyusho, Toyota (JP); Toyota Jidosha Kabushiki Kaisha, Toyota (JP)

( * ) Notice: Subject to any disclaimer, the term of this patent is extended or adjusted under 35 U.S.C. 154(b) by 776 days.

(21) Appl. No.: 11/075,332

(22) Filed: Mar. 9, 2005

(65) Prior Publication Data

US 2005/0241364 A1 Nov. 3, 2005

(30) Foreign Application Priority Data

Mar. 10, 2004 (JP) ............................ 2004-067555

(51) Int. Cl.
*G01R 27/26* (2006.01)
*G01P 15/125* (2006.01)

(52) U.S. Cl. ..................... 324/662; 324/661; 73/514.32

(58) Field of Classification Search ................. 324/661, 324/662, 679, 686; 73/514.32, 780, 862.337, 73/862.626

See application file for complete search history.

(56) References Cited

U.S. PATENT DOCUMENTS 5,095,752 A 3/1992 Suzuki et al.
5,239,871 A * 8/1993 Reidemeister et al. ... 73/514.32
5,392,651 A 2/1995 Suzuki et al.
5,559,290 A * 9/1996 Suzuki et al. ............ 73/514.32
5,945,599 A 8/1999 Fujiyoshi et al.
6,215,645 B1 * 4/2001 Li et al. ................... 73/514.32
6,772,632 B2 * 8/2004 Okada ..................... 73/514.32

FOREIGN PATENT DOCUMENTS

JP A 02-134570 5/1990
JP A 11-242050 9/1999

* cited by examiner

*Primary Examiner*—Timothy J Dole
(74) *Attorney, Agent, or Firm*—Oliff & Berridge, PLC

(57) ABSTRACT

A structure is presented in which it is easy to adjust, to a determined value, distance between electrodes of a condenser formed in an electrostatic capacity-type displacement sensor.

A displacement sensor has a conductive lower layer, an insulating layer stacked on the conductive lower layer and a conductive upper layer stacked on the insulating layer. The conductive lower layer is divided into a first lower region and a second lower region by a groove penetrating the conductive lower layer. The insulating layer is stacked on the conductive lower layer at selected portions. The conductive upper layer is stacked on the insulating layer at selected portions. The conductive upper layer has a beam connected via the insulating layer to the first lower region and the second lower region at a pair of ends of the beam. The conductive upper layer has a first upper portion forming one of electrodes of a first condenser. The first upper portion extends from a position above the first lower region to a position above the second lower region. The insulating layer is not formed between the first upper portion and the first lower region, but is formed between the first upper portion and the second lower region.

9 Claims, 17 Drawing Sheets

A
B
121
121b
121c
121b-2
121b-3
121a-2
121a-3
121b-1
644
121a
121a-1
121a-4
121a-6
121b-4
121a-5
121b-6
121b-5
122b-1
122b-2
122b-3
122a-2
122a-1
122a-3
122a-5
122a
122a-4
122a-6
122b-4
122b-6
122c
122
122b
122b-5
y
x
z

DISPLACEMENT SENSOR

CROSS-REFERENCE TO RELATED APPLICATION

The present application claims priority based on Japanese Patent application 2004-067555 filed on Mar. 10, 2004, the contents of which are hereby incorporated by reference within this application.

BACKGROUND OF THE INVENTION

1. Field of the Invention

The present invention relates to a displacement sensor for detecting the degree of displacement of an object that is subjected to force and thus displaced. If the degree of displacement of the object is detected, it is possible to measure the force applied to the object, or to measure the acceleration, angular acceleration, pressure, external force, etc. that created this force. The displacement sensor referred to here is a sensor that, by measuring physical value that changes depending on the degree of displacement, is capable of directly detecting the degree of displacement, and of indirectly measuring acceleration, angular acceleration, pressure, external force, etc.

In the present specification, a displacement sensor is described that utilizes the phenomenon that mass (an object that has mass) is displaced in response to acceleration. The displacement sensor measures, from the degree of displacement of the mass, the acceleration which has been applied to the mass. However, if the displacement sensor utilizing the technique set forth in the present specification is used in an environment in which the mass is displaced by means of angular acceleration, pressure, external force, etc., the displacement sensor can also measure the angular acceleration, pressure, external force, etc. applied to the mass. Furthermore, the displacement sensor that utilizes the technique of the present invention can also be utilized to measure the degree of displacement of the mass itself.

2. Description of the Related Art

An acceleration sensor has been developed that contains a mass that is displaced when acceleration is applied thereto, and that contains a condenser. One of electrodes of the condenser is formed in the mass. When acceleration is applied to the acceleration sensor, the mass is displaced in response to this acceleration, distance between the electrodes of the condenser changes, and the electrostatic capacity of the condenser changes. The acceleration applied to the acceleration sensor can be measured by measuring the electrostatic capacity of the condenser. An example of such an acceleration sensor is set forth in Japanese Laid Open Patent Application Publication H02 (1990)-134570.

The acceleration sensor of Japanese Laid Open Patent Application Publication H02 (1990)-134570 is provided with a mass, a beam supporting the mass, and two silicon sheets disposed above and below the mass and separated therefrom by a determined distance. The beam is adjusted so as to have adequate rigidity. Electrodes are formed at an upper face and a lower face of the mass. The electrode formed at the upper face of the mass is opposite the upper silicon sheet, and forms a first condenser. The electrode formed at the lower face of the mass is opposite the lower silicon sheet, and forms a second condenser. A pair of condensers is thus disposed in an upper and lower direction of the mass. The area of the electrode comprising the first condenser is identical with that of the electrode comprising the second condenser. Further, the distance between the electrodes of the first condenser is identical with the distance between the electrodes of the second condenser while acceleration is not applied to the mass.

When downwards acceleration is applied to the acceleration sensor, the mass is displaced upwards to a position of equilibrium by inertial force exerted upon the mass and by recovery force of the beam. When the mass is displaced upwards, the distance between the electrodes of the first condenser decreases, and the distance between the electrodes of the second condenser increases. Consequently, the electrostatic capacity of the first condenser increases, and the electrostatic capacity of the second condenser diminishes. The degree by which the electrostatic capacity of the first condenser increases is identical to the degree by which the electrostatic capacity of the second condenser diminishes.

As shown in FIG. 32, when acceleration is not being applied to the mass, that is, when the mass is in a standard location, the electrostatic capacity of both condensers is $C_0$. If the mass has been displaced due to acceleration being applied thereto, and the electrostatic capacity of one of the condensers consequently changes to $C_0+\Delta C$, the electrostatic capacity of the other condenser changes to $C_0-\Delta C$. By calculating the difference between the electrostatic capacity of both condensers $((C_0+\Delta C)-(C_0-\Delta C)=2\Delta C)$, it is possible to detect only the degree of change of electrostatic capacity $\Delta C$ in response to the acceleration. If the sensor is a differential sensor that outputs a quantity equivalent to the difference between the electrostatic capacity of both condensers, it is possible to exclude the standard electrostatic capacity $C_0$ from the sensor output, and a sensor can be obtained that outputs the quantity $2\Delta C$, this being double the quantity of change.

SUMMARY OF THE INVENTION

It is difficult to precisely adjust the distance between the mass and the upper silicon sheet and the distance between the mass and the lower silicon sheet in the acceleration sensor of Japanese Laid Open Patent Application Publication H02 (1990)-134570. That is, it is difficult to precisely adjust the distance between the electrodes of the condensers. When manufacturing the acceleration sensor of Japanese Laid Open Patent Application Publication H02 (1990)-134570 and other known acceleration sensors, a silicon base supporting the mass via a beam, and the silicon sheet forming one of the electrodes of the condenser, are manufactured by means of silicon direct bonding. The silicon sheet is bonded to the silicon base so that it is disposed at a determined distance from the mass.

In silicon direct bonding, the silicon base and the silicon sheet are bonded by being heated to over 1000°. When the acceleration sensor that has been bonded at high temperatures returns to room temperature, each of the components can easily bend due to differences in the coefficient of thermal expansion of the mass, beam, silicon sheet, etc., and due to variation in temperature distribution during the manufacture process, etc. This may create the problem that the distance is not constant between the electrodes of the condensers consisting of the mass and the silicon sheets.

In acceleration sensors like that of Japanese Laid Open Patent Application Publication H02 (1990)-134570, in which acceleration is measured from the degree of changes in electrostatic capacity of the condensers, it is extremely important to manufacture the sensor such that the distance between the electrodes is accurate. In particular, in a differential sensor such as that of Japanese Laid Open Patent Application Publication H02 (1990)-134570, in which the difference between the electrostatic capacities of a pair of condensers is utilized, the influence of standard electrostatic capacity can be excluded from the output of the differential sensor only if the distances between the electrodes are accurately matched. In the case of differential sensors, it is extremely important that there is an accurate match in the distances between the electrodes of the pair of condensers. Furthermore, this issue is not limited to the case of differential sensors. In general, it is important that the distance between the electrodes of the condenser is formed accurately in displacement sensors that utilize the condenser.

The present invention presents a new and novel configuration for a displacement sensor in which it is easy to adjust, to a determined value, the distance between electrodes of the condensers for measuring the degree of displacement.

A displacement sensor according to the invention comprises a conductive lower layer, an insulating layer stacked on the conductive lower layer, and a conductive upper layer stacked on the insulating layer. The conductive lower layer is divided into a first lower region and a second lower region by a groove penetrating the conductive lower layer. The first lower region and the second lower region are connected by a beam. The beam is flexible, so that the first lower region shifts or moves relative to the second lower region when a force is applied to the first lower region.

The insulating layer is stacked on the conductive lower layer at selected portions. The conductive upper layer is stacked on the insulating layer at selected portions. The conductive upper layer has an upper portion forming one of electrodes of a condenser. The upper portion extends from a position above the first lower region to a position above the second lower region. The insulating layer is not formed between the upper portion and the first lower region, but is formed between the upper portion and the second lower region.

The beam connects the first lower region and the second lower region such that the first lower region shifts relative to the second lower region when a force is applied to the first lower region. Instead, however, the beam may connect the first lower region and the second lower region such that the second lower region shifts relative to the first lower region when a force is applied to the second lower region. Below, the case will be described in which the beam connects the first lower region and the second lower region such that the first lower region shifts relative to the second lower region when a force is applied to the first lower region.

When a force is applied to the first lower region, the first lower region shifts relative to the second lower region in accordance with the degree of force. When the first lower region shifts relative to the second lower region, the distance between electrodes of a condenser consisting of an upper portion (a portion of the conductive upper layer) and the first lower region (a portion of the conductive lower layer), changes, and electrostatic capacity of the condenser consequently changes. The degree of change in the electrostatic capacity of the condenser is detected using an electrostatic capacity detecting circuit, and the degree of displacement of the first lower region relative to the second lower region can thus be measured. The force applied to the first lower region can be measured from the degree of displacement. When the force is not being applied to the first lower region, that is, when the first lower region is not shifting relative to the second lower region, the distance between the electrodes of the condenser—these consisting of a portion of the conductive lower layer and a portion of the conductive upper layer—is adjusted based on a thickness of the insulating layer. It is possible to accurately form the distance between the electrodes of the condenser when there is no relative displacement of the first lower region and the second lower region.

If the degree of change in electrostatic capacity is to be found by detecting the difference in electrostatic capacities between a pair of condensers, it is important that there is an identical distance between the electrodes of the pair of condensers when there is no relative displacement of the first lower region and the second lower region. In order to manufacture a good differential type displacement sensor, it is important to manufacture the pair of condensers having the identical distance between the electrodes. The present invention deals effectively with this issue.

In order to manufacture a good differential type displacement sensor that outputs only the degree of change in electrostatic capacity, a second upper portion is formed on the conductive upper layer. The second upper portion extends from a position above the first lower region to a position above the second lower region. The insulating layer is formed between the second upper portion and the first lower region, but is not formed between the second upper portion and the second lower region. A first condenser is formed between the first upper portion and the first lower region and a second condenser is formed between the second upper portion and the second lower region.

There is an identical distance between the electrodes of the pair of condensers when there is no relative displacement of the first lower region and the second lower region, and the electrostatic capacity of the pair of condensers is identical. When there is relative displacement of the first lower region and the second lower region in the stacked direction, the distance between the electrodes of the first condenser increases, and the distance between the electrodes of the second condenser decreases. The degree of change in electrostatic capacity can be found by detecting the difference between the electrostatic capacities of the first condenser and the second condenser.

In this case, also, the beam may provide support so as to allow the displacement of either the first lower region or the second lower region. Below, the case will be described in which the beam connects the first lower region and the second lower region such that the first lower region shifts relative to the second lower region when a force is applied to the first lower region.

In the aforementioned displacement sensor, the insulating layer connects the first lower region that comprises the first condenser and the second upper portion that comprises the second condenser. Consequently, if the distance between the electrodes of the first condenser increases as the first lower region is displaced, the distance decreases between the electrodes of the second condenser. Conversely, when the distance between the electrodes of the first condenser decreases, the distance increases between the electrodes of the second condenser. The area of the electrodes forming the first condenser is identical with the area of the electrodes forming the second condenser. Further, there is an identical distance between the electrodes of the first condenser and the electrodes of the second condenser when there is no relative displacement of the first lower region and the second lower region. As a result, the electrostatic capacity of the first condenser and second condenser, when in a standard location, is identical. It is consequently possible to detect the degree of change in electrostatic capacity by means of differentiation.

It is preferred that the first lower region is surrounded by the second lower region, and that a portion of the second lower region opposite the second upper portion is electrically isolated from a remaining portion of the second lower region.

This isolation can be achieved by using a method such as, for example, forming a slit in the second lower region so as to divide it spatially, or by forming an insulating region in the second lower region.

The portion of the second lower region opposite the second upper portion forms one of the electrodes of the second condenser. The portion of the second lower region that forms the second condenser is electrically separated from the remaining portion of the second lower region. As a result, it is possible to reduce the influence of electrical noise, etc. affecting the remaining portion of the second lower region to the portion of the second lower region that forms the second condenser. It is thus possible to reduce noise in the electrostatic capacity detected by the second condenser.

Moreover, the slit or the insulating region for insulating the portion of the second lower region that forms the second condenser from the remaining portion of the second lower region need not necessarily correspond to a border line of the second upper portion. It may equally well be formed in any position in the second lower region opposite the second upper portion as long as this position allows a reduction in the effects of electrical noise, etc.

It is preferred that the insulating layer and the conductive upper layer are stacked on a portion of a surface of the first lower region, and that a portion of the insulating layer is removed so that the first lower region and the conductive upper layer stacked on the first lower region are electrically connected. In this case, it is preferred that a condenser capacity detecting circuit is connected with each of: the first upper portion, the conductive upper layer stacked on the first lower region, and the second lower region.

Instead of directly connecting the capacity detecting circuit and the portion of the second lower region that forms the second condenser, it is also possible to electrically connect the second lower region that forms the second condenser and the conductive upper layer stacked on the second lower region, and to connect the capacity detecting circuit with the conductive upper layer. All wiring of the condenser capacity detecting circuit, including two other sets of wiring, can be connected with the conductive upper layer if the condenser capacity detecting circuit is connected with the portion of the second lower region that forms the second condenser though the conductive upper layer stacked on the second lower region. A process such as wire bonding thus becomes extremely simple.

An unintended condenser will be formed by the first lower region and the conductive upper layer stacked on the first lower region. The unintended condenser will given an error for the detection of the intended condenser capacity. It is possible to eliminate unwanted influences on the unintended condenser that is formed by the first lower region and the conductive upper layer stacked on the first lower region by having the first lower region and the conductive upper layer stacked on the first lower region be electrically connect. It is possible, in the electrostatic capacity that is detected, to exclude the electrostatic capacity of the unintended condenser. More accurate detection is thus possible.

The electrostatic capacity of the first condenser can be detected using the condenser capacity detecting circuit that is connected between the first upper portion and the conductive upper layer stacked on the first lower region. The electrostatic capacity of the second condenser can be detected using the condenser capacity detecting circuit that is connected between the second lower region and the conductive upper layer stacked on the first lower region. It is thus possible to obtain a differential sensor in which the difference is calculated between the electrostatic capacity of the first condenser and the electrostatic capacity of the second condenser.

It is possible to form, from the conductive upper layer, a beam connecting the first lower region and the second lower region. It is preferred that a portion of the conductive upper layer comprises the beam, and that each of two ends of the beam is connected, respectively, with the first lower region and the second lower region via the insulating layer.

If the conductive upper layer is used to manufacture the beam, there is no need to provide separate material for the beam. The configuration is simpler, and a structure which is easy to make can be achieved.

In the case where the beam is formed from a portion of the conductive upper layer, it is preferred that the insulating layer is not formed between the conductive upper layer and the conductive lower layer excepting for at the two ends of the beam.

The beam may be connected such that displacement of either the first lower region or the second lower region is possible. Below, the case is described in which the beam connects the first lower region and the second lower region such that, when force is applied to the first lower region, the first lower region is displaced relative to the second lower region.

It is preferred that the first upper portion that extends from the second lower region side and forms the first condenser, and the second upper portion that extends from the first lower region side and forms the second condenser, are both short so that they will not bend. If the first upper portion or the second upper portion bends, elements other than the displacement of the first lower region will affect the distance between the electrodes of the first condenser and second condenser. Consequently, errors will be introduced into the results detected. Since the first upper portion and the second upper portion must be short, it is necessary for the groove separating the first lower region and the second lower region to be narrow. If the groove is narrow, the beam connecting the first lower region and the second lower region will generally be short. It is easier, however, for the first lower region to be displaced when the beam is longer, and the sensitivity of the sensor can be increased.

To deal with this, the beam is formed from the conductive upper layer extending above the second lower region for a long distance. The insulating layer is not formed between the conductive upper layer and the conductive lower layer excepting for at the two ends of the beam. It is possible to obtain a long beam by this means. Since the condenser is formed by removing the insulating layer, it is possible to displace the portion of the first lower region within the thickness of the insulating layer. It is thus possible to maintain a requisite clearance for the deformation of the beam simply by removing the insulating layer located beneath the conductive upper layer that forms the beam.

If the clearance required for the deformation of the beam can be maintained by removing the insulating layer, the groove between the first lower region and the second lower region can be made narrow, and the first lower region and the second lower region can be brought closer together. As a result, the first upper portion extending from the second lower region and forming the first condenser, and the second upper portion extending from the first lower region and forming the second condenser, can both be shorter. It is consequently more difficult for the extending portions to bend, and the accuracy of the sensor can be improved. Further, the first lower region can be made larger and heavier. The first lower region can more easily be displaced if it is heavy. By using a long beam and a heavy first lower region, and by shortening the first upper portion and the second upper portion, the sensitivity and accuracy of the sensor can be improved.

In the case where the first lower region is surrounded by the second lower region, it is possible to use the conductive upper layer to form a third upper portion and a fourth upper portion. The third upper portion passes above the first lower region and links two opposing portions of the second lower region with the first lower region being interposed therebetween. The fourth upper portion is stacked on the first lower region with the insulating layer therebetween, and extends above two opposing parts of the second lower region with the first lower region being interposed therebetween. In this case, the insulating layer is not formed between the third upper portion and the first lower region. In addition, the insulating layer is not formed between the fourth upper portion and the second lower region.

In this case, the beam connects the second lower region and the first lower region such that, when force is applied to the first lower region, the first lower region is displaced relative to the second lower region.

When voltage is applied to the third upper portion, electrostatic attraction operates between the first lower region and the third upper portion, and the first lower region is consequently attracted towards the third upper portion. If voltage is applied to the fourth upper portion, electrostatic attraction operates between the second lower region and the fourth upper portion, and the second lower region is consequently attracted towards the fourth upper portion.

By applying voltage to the third upper portion and/or the fourth upper portion, the aforementioned displacement sensor prevents the first lower region from being displaced relative to the second lower region. It is possible to detect the force applied to the first lower region from the amount of voltage that had to be applied to the third upper portion and/or the fourth upper portion to prevent the displacement of the first lower region. Further, it is possible to detect physical values (acceleration, for example) that produced the force. Such measurable physical values are not restricted by the amplitude of bending of the beam, and consequently measurement is possible across a wider range.

The displacement sensor that detects physical values applied to the first lower region, by means of restricting the displacement of the first lower region, is particularly suitable for use as a multi-direction displacement sensor. In this case, it is preferred that the beam connects the first lower region and the second lower region such that the first lower region can be displaced, relative to the second lower region, in a stacked direction and in a direction orthogonal to the stacked direction.

If the stacked direction is z, this displacement sensor may be used as a displacement sensor for measuring displacement in two directions, namely, the z direction and an x direction orthogonal thereto, or may be used as a displacement sensor for measuring displacement in three directions, namely, in a y direction as well.

Displacement of the first lower region is prevented in the aforementioned displacement sensor. Consequently the problem does not occur that the application of force in one direction displaces the first lower region and thus changes the values detected relating to the other directions. As a result, it is possible to accurately measure the force of a plurality of directions. This is particularly effect in the case where configuration tends to become more complicated, as with three-direction acceleration sensors. With the displacement sensor of the present invention, it is possible to connect all wiring of the condenser capacity detecting circuit with the conductive upper layer. It is thus possible to simplify the configuration of the three-direction acceleration sensor.

In the case where the first lower region is surrounded by the second lower region, it is possible to form a supporting column that extends towards a sensor supporting structure from a lower face of the second lower region, and thereby fix the sensor to the supporting structure. In this case, it is preferred that a slit making a loop around the supporting column is formed between a portion of the conductive lower layer located above the extending supporting column and the remaining portion of the conductive lower layer.

This type of displacement sensor is usually used while mounted on the sensor supporting structure that is fixed to an object to be measured. However, when the sensor supporting structure is to be fixed to the object to be measured, residual stress may operate upon the displacement sensor. This may lead to a situation such as, for example, the beam that comprises a part of the displacement sensor is bent due to the residual stress. As a result, it is frequently difficult to perform precise measurements. Further, there is a risk that thermal operation or contraction, etc. of the sensor supporting structure itself may exert residual stress on the displacement sensor.

In the displacement sensor described above, the slit functions as a spring. This enables a reduction in the residual stress exerted, due to the above reasons, on the displacement sensor.

Moreover, it is preferred that a fixing material with insulating properties is utilized to fix the supporting column of the displacement sensor and the sensor supporting structure. The conductive lower layer of the displacement sensor can thus be insulating from the external environment.

A base structure having a conductive lower layer, an insulating layer stacked on the conductive lower layer, and a conductive upper layer stacked on the insulating layer may be used to manufacture the sensor of the invention. It is favorable to use, for example, an SOI (Silicon on Insulator) as the base substrate having a silicon lower layer, a silicon oxide insulating layer stacked on the silicon lower layer, and a silicon upper layer stacked on the silicon oxide insulating layer. The thickness of the silicon oxide insulating layer of the SOI base substrate is controlled precisely to have a constant value. Consequently, using the SOI base makes it easy to obtain a displacement sensor in which distance between electrodes of a condenser is adjusted precisely to have a constant value.

A displacement sensor of the invention may also be defined as follows. The displacement sensor of the invention is made of stacked layers of a conductive lower layer, an insulating layer and a conductive upper layer. The displacement sensor is formed by removing portions to leave selected portions of the stacked layers. A groove penetrating the conductive lower layer is formed so that the conductive lower layer is divided into a first lower region and a second lower region. The selected portion of the conductive upper layer is left so that one of electrodes of a condenser is formed. The selected upper portion forming the electrode of the condenser extends from a position above the first lower region to a position above the second lower region. The insulating layer is removed between the selected upper portion and the first lower region, and is left between the selected upper portion and the second lower region.

One characteristic of the displacement sensor described above is the use of stacked layers. Since the displacement sensor is manufactured using stacked layers, it has the characteristic that the distance between electrodes of the condenser can easily be adjusted to a determined value. That is, in the aforementioned displacement sensor, the condenser can be manufactured by removing the insulating layer, and the distance between the electrodes of the condenser can be adjusted based on the thickness of the insulating layer, the thickness having been adjusted in advance. By adjusting the thickness of the insulating layer that comprises a part of the stacked layers in advance to have a determined value, the distance between the electrodes of the condenser can be formed so as to have the determined value. The structure of the displacement sensor is such that it is easy to make a sensor exhibiting desired sensor characteristics.

Furthermore, the smaller the distance between the electrodes of the condenser, the greater the electrostatic capacity. This makes it possible to obtain a sensor in which, relative to an identical degree of displacement, there is a greater degree of change in electrostatic capacity as the distance between the electrodes of the condenser grows smaller. That is, a sensor can be obtained in which the smaller the distance between the electrodes of the condenser, the higher the measurement sensitivity. It is easy to obtain a displacement sensor in which there is a small distance between the electrodes of the condenser by preparing a thin insulating layer in the aforementioned displacement sensor. A displacement sensor can be obtained in which sensor characteristics are stable, and in which these sensor characteristics are highly sensitive.

In the case where an SOI base substrate is used as an example of stacked layers, it is easy to form a condenser in which distance between electrodes has been adjusted to a determined value by removing, by means of etching, a silicon oxide layer that corresponds to an insulating layer.

If the etching technique is utilized, it is not necessary to manufacture the sensor in a high temperature atmosphere, as with the conventional manufacturing method (silicon direct bending). Problems caused thereby, such as differences in the coefficient of thermal expansion of each component, can consequently be avoided. Moreover, a wider choice of materials can be used for the displacement sensor since it is possible to utilize even materials that have poor thermal tolerance. It is problematic to use aluminum, which has a lower melting point, as a material for wiring or electrodes when the conventional displacement sensor is manufactured. By contrast, it is possible to use aluminum in the displacement sensor of the present invention. Existing processing techniques can be utilized successfully.

The present invention also presents a method for manufacturing a displacement sensor from a base substrate having stacked therein a conductive lower layer, an insulating layer and a conductive upper layer. The method comprises: a process for forming a groove in the conductive lower layer, this groove penetrating the conductive lower layer and thus dividing the conductive lower layer into a first lower region and a second lower region, a process for performing etching on a portion of the conductive upper layer so as to leave a portion extending from a position above the first lower region to a position above the second lower region, a process for forming a plurality of etching holes in a portion of the conductive upper layer located above the first lower region, and a process for supplying etching material to the etching holes, the etching material etching the insulating layer without etching the conductive lower layer or the conductive upper layer, and the process removing the insulating layer located between the first lower region and the conductive upper layer above the first lower region, and leaving the insulating layer located between the second lower region and the conductive upper layer above the second lower region.

In the manufacturing method of the present invention, the insulating layer that has a constant thickness is removed by using an etching technique. The distance between the conductive upper layer and the conductive lower layer, which has been formed by removing the insulating layer, is adjusted based on a thickness of the insulating layer. It is thus possible to easily form a condenser in which the distance between the electrodes has been adjusted to a constant value.

Furthermore, in the case of the conventional technique for manufacturing the displacement sensor by means of silicon direct bonding, a comparatively large area is required for bonding, and this limits any reduction in size of the sensor. Using the manufacturing method of the present invention, however, minute processing utilizing the etching technique is possible. It is thus easy to reduce the size of the sensor.

A displacement sensor according to the invention may comprise a conductive lower layer, an insulating layer stacked on the conductive lower layer, and a conductive upper layer stacked on the insulating layer. The conductive lower layer is divided into a first lower region and a second lower region by a groove penetrating the conductive lower layer. The first lower region and the second lower region are connected by a beam. The beam is flexible, so that the first lower region shifts or moves relative to the second lower region when a force is applied to the first lower region.

The insulating layer is stacked on the conductive lower layer at selected portions. The conductive upper layer is stacked on the insulating layer at selected portions. The conductive upper layer has an upper portion forming one of electrodes of a condenser. The upper portion extends from a position above the first lower region to a position above the second lower region. A space is formed between the upper portion and the first lower region, and the insulating layer is formed between the upper portion and the second lower region.

A condenser is formed between the upper portion and the first lower region. Since the space is formed between the upper portion and the first lower region, the distance between electrodes of the condenser is able to changes. The degree of change in the electrostatic capacity of the condenser is detected using an electrostatic capacity detecting circuit, and the degree of displacement of the first lower region relative to the second lower region can thus be measured.

It is important to provide the space between the upper portion and the first lower region so that the distance between electrodes of the condenser can change. The space may be formed by removing the insulating layer between the upper portion and the first lower region, however, it is not necessary to remove the insulating layer completely. A surface of the upper portion facing to the first lower region and/or a surface of the first lower region facing to the upper portion, can be covered with a thin insulating film. If the surface(s) is(are) covered with insulating film, which is thinner than the insulating layer, the space is provided between the upper portion and the first lower region and an electric short circuit will not be formed between the upper portion and the first lower region even if a strong force is applied and the upper portion and the first lower region contact.

According to the present invention, a condenser in which distance between electrodes has been adjusted to a constant value can be manufactured easily, and high yield manufacture is possible of a displacement sensor in which sensor characteristics have been adjusted to a constant value.

DETAILED DESCRIPTION OF THE INVENTION

Description of the Preferred Features

The preferred features of the present invention will be described below.

(First Preferred Feature)

A sensor comprises a conductive lower layer divided into a first lower region and a second lower region by a groove penetrating the conductive lower layer. The sensor detects displacement of the first lower region with respect to the second lower region.

(Second Preferred Feature)

The first lower region is at the center of the second lower region. The second lower region surrounds the first lower region. Beams extending symmetrical directions from corners of the first lower region.

(Third Preferred Feature)

A pair of displacement sensors is provided. A beam in a first displacement sensor is long, and a beam in a second displacement sensor is short. Otherwise, however, the configuration and shape of the displacement sensors are identical. The beam of the second displacement sensor is short enough that displacement of the first lower region is essentially prevented. The second sensor works as a reference sensor.

Providing the reference sensor means that, by finding the difference in output of the two sensors, it is possible to offset influences such as electrical noise, temperature drift, etc. As with the differential sensor, this displacement sensor is able to detect only the degree of change in electrostatic capacity. More accurate measurement is thus possible.

Description of the Preferred Embodiments

Various embodiments of the present invention will be described below. These are merely examples, and do not set limit the claims scope of the present invention.

First Embodiment

Figure 1:
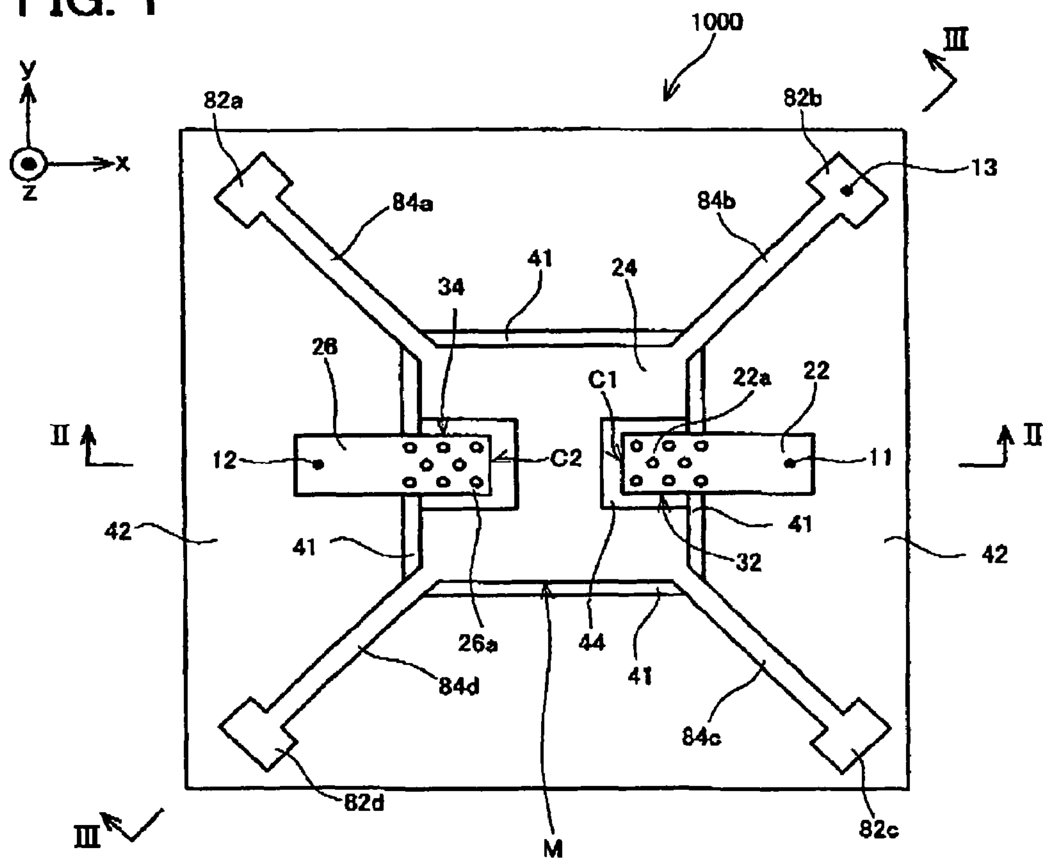
FIG. 1 shows a schematic plan view of an acceleration sensor of a first embodiment.
Figure 2:
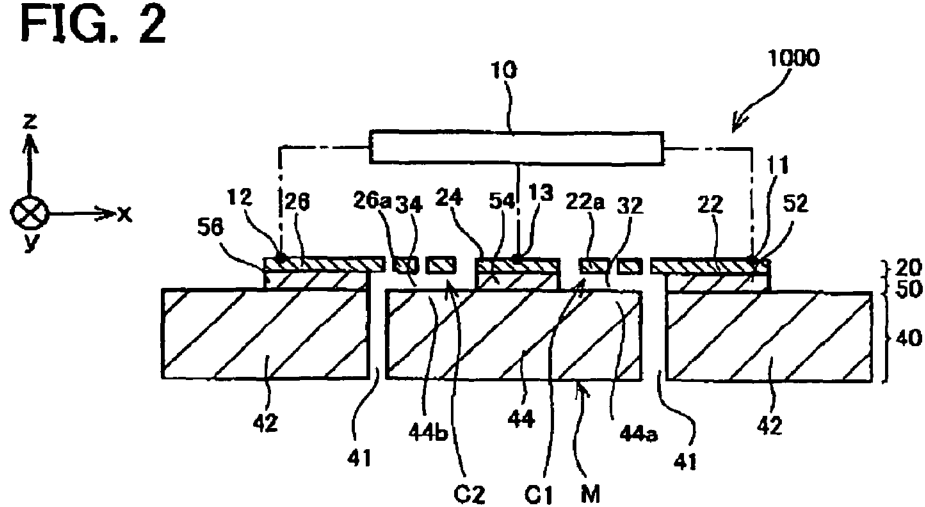
FIG. 2 shows a longitudinal section along a line II-II of the acceleration sensor of the first embodiment.
Figure 3:
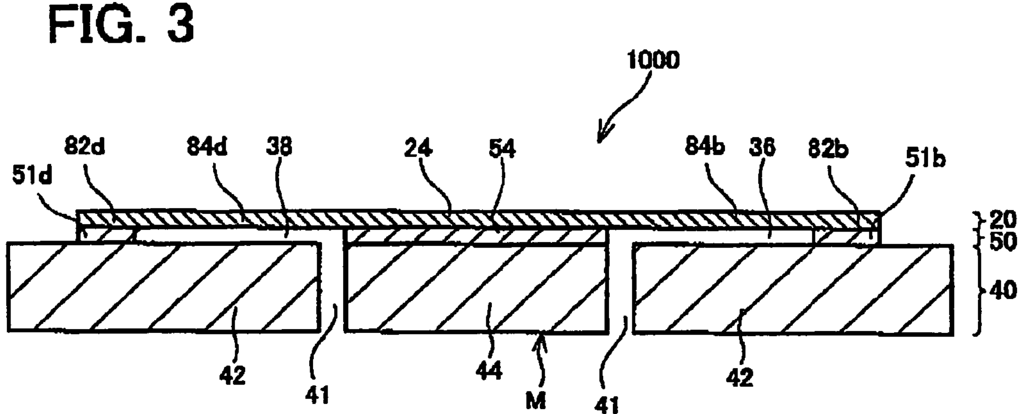
FIG. 3 shows a longitudinal section along a line III-III of the acceleration sensor of the first embodiment.

FIGS. 1 to 3 schematically show the structure of an acceleration sensor 1000. FIG. 1 is a plan view of the acceleration sensor 1000. FIG. 2 corresponds to a longitudinal section along a line II-II of FIG. 1, and FIG. 3 corresponds to a longitudinal section along a line III-III of FIG. 1. The acceleration sensor 1000 is used to measure acceleration in a z direction (a direction perpendicular to the face of the page in FIG. 1, and the up-down direction of the page in FIGS. 2 and 3).

First, a simple description will be given of the structure of the acceleration sensor 1000 with reference to FIGS. 1 to 3. The acceleration sensor 1000 is made of an SOI (Silicon on Insulator) having stacked layers comprising a conductive lower layer 40 formed from monocrystal silicon, an insulating layer 50 formed from silicon oxide stacked on the conductive lower layer 40, and a conductive upper layer 20 formed from monocrystal silicon stacked on the insulating layer 50. The insulating layer 50 insulates the conductive lower layer 40 and the conductive upper layer 20. A high concentration of impurities has been introduced to the conductive lower layer 40 and conductive upper layer 20, such that these are essentially conductors.

The conductive lower layer 40 is divided into a first lower region 44 and a second lower region 42 by a dividing groove 41 that penetrates the conductive lower layer 40 and surrounds the first lower region 44. The dividing groove 41 divides the first lower region 44 from the second lower region 42 both mechanically and electrically. The dividing groove 41 makes a closed loop around the first lower region 44. The second lower region 42 surrounds the first lower region 44.

As shown in FIG. 1, the major part of the conductive upper layer 20 and the insulating layer 50 that are located outside the dividing groove 41 are removed, this exposing the major part of a surface of the second lower region 42. A central portion 54 of the insulating layer 50 is stacked on the first lower region 44. The central portion 54 of the insulating layer 50 will be referred to a first insulating layer 54. The insulating layer 50 is also stacked on the second lower region 42 at selected portions. Specifically, the insulating layer 50 is left so as to form upper portion fixing insulating layers 52 and 56 and beam fixing insulating layers 51*a*, 51*b*, 51*c*, and 51*d* that will be explained later. The conductive upper layer 20 is stacked on the insulating layer 50 at selected portions. Specifically, a central portion 24 of the conductive upper layer 20 is stacked on the first insulating layer 54. The central portion 24 of the conductive upper layer 20 will be referred to a first upper layer 24. The first lower region 44, the first insulating layer 54, and the first conductive upper layer 24 are joined to form a mass M. The first lower region 44, the first insulating layer 54, and the first conductive upper layer 24 function as a mass M that is displaced when it receives acceleration applied to the acceleration sensor 1000.

The conductive upper layer 20 has upper portion 22 forming one of electrodes of a condenser C1. The conductive upper layer 20 has upper portions 26 forming one of electrodes of a condenser C2. The upper portions 22 and 26 extend from a position above the first lower region 44 to a position above the second lower region 42. The insulating layer 50 is formed between the upper portions 22 and 26 and the second lower region 42. The insulating layer 50 connects the upper portions 22 and 26 and the second lower region 42 in the form of upper portion fixing insulating layers 52 and 56. The insulating layer 50 is not formed between the first lower region 44 and extending portions 22*a* and 26*a* in the upper portions 22 and 26. The insulating layer 50 is removed between the extending portions 22*a* and 26*a* and the opposing portions 44*a* and 44*b*, thus forming spaces 32 and 34. The condenser C1 is formed from the extending portions 22*a* in the upper portion 22 and opposing portions 44*a* in the first lower region 44. The condenser C2 is formed from the extending portions 26*a* in the upper portion 26 and opposing portions 44*b* in the first lower region 44. In the acceleration sensor 1000, the extending portions 22*a* and 26*a* function as fixed electrodes of condensers C1, C2, and the opposing portions 44*a* and 44*b* function as movable electrodes of condensers C1, C2.

Moreover, a plurality of holes is formed in the extending portions 22*a* and 26*a*. The holes were used for etching the insulating layer 50. This will be described in detail later in the description of manufacturing methods.

The acceleration sensor 1000 is provided with beams 84*a*, 84*b*, 84*c*, and 84*d* which connect the first lower region 44 and the second lower region 42. The beams 84*a*, 84*b*, 84*c*, and 84*d* extend towards a periphery of the second lower region 42 from corners of the first conductive upper layer 24 above the second lower region 42. The beams 84*a*, 84*b*, 84*c*, and 84*d* are formed from the conductive upper layer 20.

As shown in FIGS. 1 and 3, inner ends of the beams 84*a*, 84*b*, 84*c*, and 84*d* are connected with the first lower region 44 via the first the insulating layer 54, and outer ends 82*a*, 82*b*, 82*c*, and 82*d* of the beams 84*a*, 84*b*, 84*c*, and 84*d* are connected with the second lower region 42 via beam fixing insulating layers 51*a*, 51*b*, 51*c*, and 51*d* of the insulating layer 50.

The insulating layer 50 is left between the conductive upper layer 20 and the conductive lower layer 40 only at both ends of the beams 84*a*, 84*b*, 84*c*, and 84*d*. The beams 84*a*, 84*b*, 84*c*, and 84*d* extend towards the periphery of the second lower region 42 above the second lower region 42.

The beams 84*a*, 84*b*, 84*c*, and 84*d* support the first lower region 44, the first insulating 54, and the first conductive upper layer 24 such that these regions can be displaced relative to the second lower region 42. The beams 84*a*, 84*b*, 84*c*, and 84*d* are separated from the second lower region 42 by a space 36, 38 respectively, whose thickness corresponds to that of the insulating layer 50. The space 36, 38 between the beams 84*a*, 84*b*, 84*c*, and 84*d* and the second lower region 42 is formed by removing the insulating layer 50.

In the acceleration sensor 1000, an example was described in which the major part of the insulating layer 50 and the conductive upper layer 20 on the second lower region 42 is removed. However, it is possible to instead remove the conductive upper layer 20 and the insulating layer 50 only at the periphery of the beams 84*a*, 84*b*, 84*c*, and 84*d*. In brief, the beams 84*a*, 84*b*, 84*c*, and 84*d* may be formed by removing their periphery. The same operations and effects would be obtained with this acceleration sensor.

The operation of the acceleration sensor 1000 when acceleration is applied thereto will be described using FIG. 2. When acceleration is applied to the acceleration sensor 1000 in the z direction, the mass M is displaced upwards or downwards to a position of equilibrium by inertial force exerted upon the mass M and by recovery force of the beams 84*a*, 84*b*, 84*c*, and 84*d*. When the mass M is displaced, the distance of the spaces 32 and 34 changes. If, for example, acceleration is applied upwards, relative to the paper in FIG. 2, the mass M is displaced downwards relative to the second lower region 42. As a result, the distance of the spaces 32 and 34 increases. Electrostatic capacity of the condensers C1 and C2 changes as the distance of the spaces 32 and 34 changes, this degree of change in electrostatic capacity of the condensers C1 and C2 is detected, and is converted to measure acceleration.

The spaces 32 and 34 are formed in the same plane as the insulating layer 50, and the distance of the spaces 32 and 34 is substantially identical to the thickness of the insulating layer 50. Since the spaces 32 and 34 are formed by removing the insulating layer 50, the distance of the spaces 32 and 34 can be adjusted to a value corresponding to a thickness of the insulating layer 50. It is possible to accurately adjust the distance of the spaces 32 and 34 to a determined value by adjusting the thickness of the insulating layer 50 in advance. Consequently, it is possible to accurately adjust the electrostatic capacity of the condensers C1 and C2 when acceleration is not being exerted upon the mass M, that is, when the mass M is in a standard location. The acceleration sensor 1000 thus has a structure which can easily be provided with desired characteristics.

Next, the case will be described in which acceleration is measured by providing a condenser capacity detecting circuit 10. The reference numbers 11, 12, and 13 in FIG. 1 are locations for connecting the condenser capacity detecting circuit 10. The condenser capacity detecting circuit 10 may be connected between the reference numbers 11 and 12, between 11 and 13, or between 12 and 13.

Figure 4:
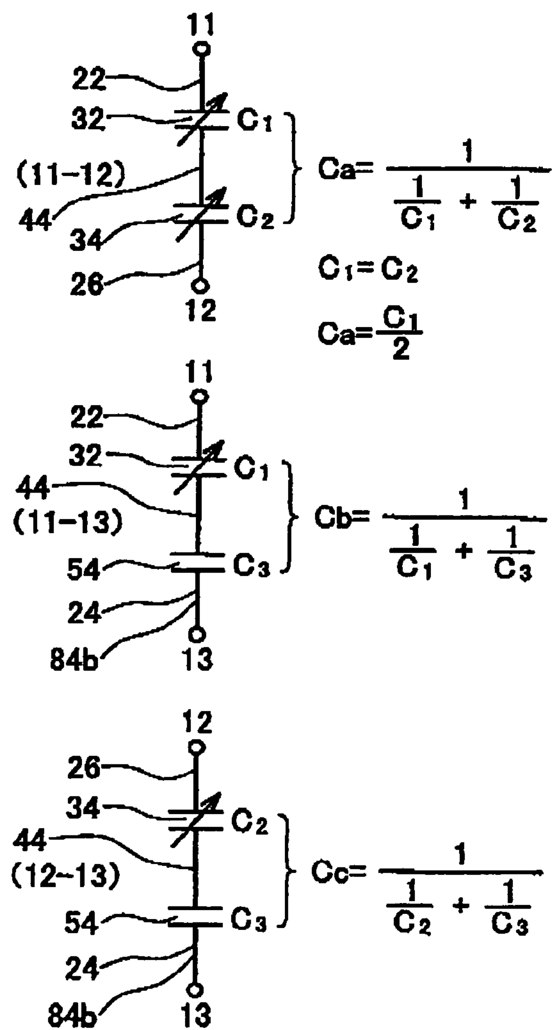
FIG. 4 shows an equivalent circuit of the acceleration sensor of the first embodiment.

First, a case will be described in which the condenser capacity detecting circuit 10 is connected between the reference numbers 11 and 12. In this case, the condenser capacity detecting circuit 10 is connected between the upper portion 22 at the right side of the figure, and the upper portion 26 at the left side of the figure. FIG. 4 shows an equivalent circuit between 11-12. A capacity Ca detected by the condenser capacity detecting circuit 10 between 11 and 12 will be an equivalent composite capacity (Ca) in the case where the electrostatic capacity (C1) of the space 32 at the right side and the electrostatic capacity (C2) of the space 34 at the left side are directly connected. Since there is an identical distance between the electrodes of the spaces 32 and 34 and these have an identical opposing area, the electrostatic capacity (C1) of the space 32 and the electrostatic capacity (C2) of the space 34 are identical. Consequently, the degree of change in the electrostatic capacity of the spaces 32 and 34 is detected, using the condenser capacity detecting circuit 10, by detecting the degree of change of the composite capacity (Ca). The acceleration that has been applied can be measured from the degree of change in electrostatic capacity that is detected.

Next, a case will be described in which the condenser capacity detecting circuit 10 is connected between the reference numbers 11 and 13. In this case, the condenser capacity detecting circuit 10 is connected between the upper portion 22 at the right side of the figure, and the end 82*b* of the beam 84*b*. The condenser capacity detecting circuit 10 may also be connected to the first conductive upper layer 24 instead of to the end 82*b* of the beam 84*b*. The first conductive upper layer 24 and the end 82*b* of the beam 84*b* are electrically connected by the conductive beam 84*b*. Consequently, even though the condenser capacity detecting circuit 10 is connected to the end 82*b* of the beam 84*b*, this equivalent to connecting the condenser capacity detecting circuit 10 to the first conductive upper layer 24. Since the end 82*b* of the beam 84*b* is not displaced in response to acceleration, it is preferable to connect the condenser capacity detecting circuit 10 to the end 82*b* of the beam 84*b*.

FIG. 4 shows an equivalent circuit between 11-13. A composite capacity Cb detected by the condenser capacity detecting circuit 10 between 11 and 13 will be the equivalent composite capacity (Cb) in the case where the electrostatic capacity (C1) of the space 32 at the right side is directly connected with the capacity (C3) formed by the first conductive upper layer 24, the first insulating layer 54, and the first lower region 44.

The capacity (C3) formed by the first conductive upper layer 24, the first insulating layer 54, and the first lower region 44 is a fixed capacity that does not change in response to displacement of the mass M. This corresponds to a constant offset value being added to sensor output. The effects of the capacity C3 can be removed by providing a circuit in a sensor output processing circuit to remove the capacity C3. It is also possible to have the first lower region 44 and the first conductive upper layer 24 electrically connected to eliminate the capacity C3. In this case, more precise measurement can be realized. Acceleration can be measured from the degree of change in electrostatic capacity that has been detected by the condenser capacity detecting circuit 10.

In the case where the condenser capacity detecting circuit 10 is connected between 12 and 13, the same method can be used to measure acceleration as in the case where the condenser capacity detecting circuit 10 is connected between 11 and 13.

The mass M may rotate around an axis extending in a y direction. When the mass M rotates in response to an angular acceleration, the distance between the electrodes of the space 32 decreases, and the distance between the electrodes of the space 34 increases. When the mass M rotates in the opposite direction, the distance between the electrodes of the space 32 increases, and the distance between the electrodes of the space 34 decreases. If the condenser capacity detecting circuit is connected to the condensers C1 and C2 formed by the spaces 32 and 34, the electrostatic capacities of the condensers C1 and C2 formed by the spaces 32 and 34 can be detected. By calculating the difference between the two, it is possible to detect the difference in the degree of change in their electrostatic capacity.

Further, in the acceleration sensor 1000, the condensers C1 and C2 are formed between the first lower region 44 and the upper portions 22 and 26. Instead, however, the condensers may be formed between the second lower region 42 and the upper portions 22 and 26.

Second Embodiment

Figure 5:
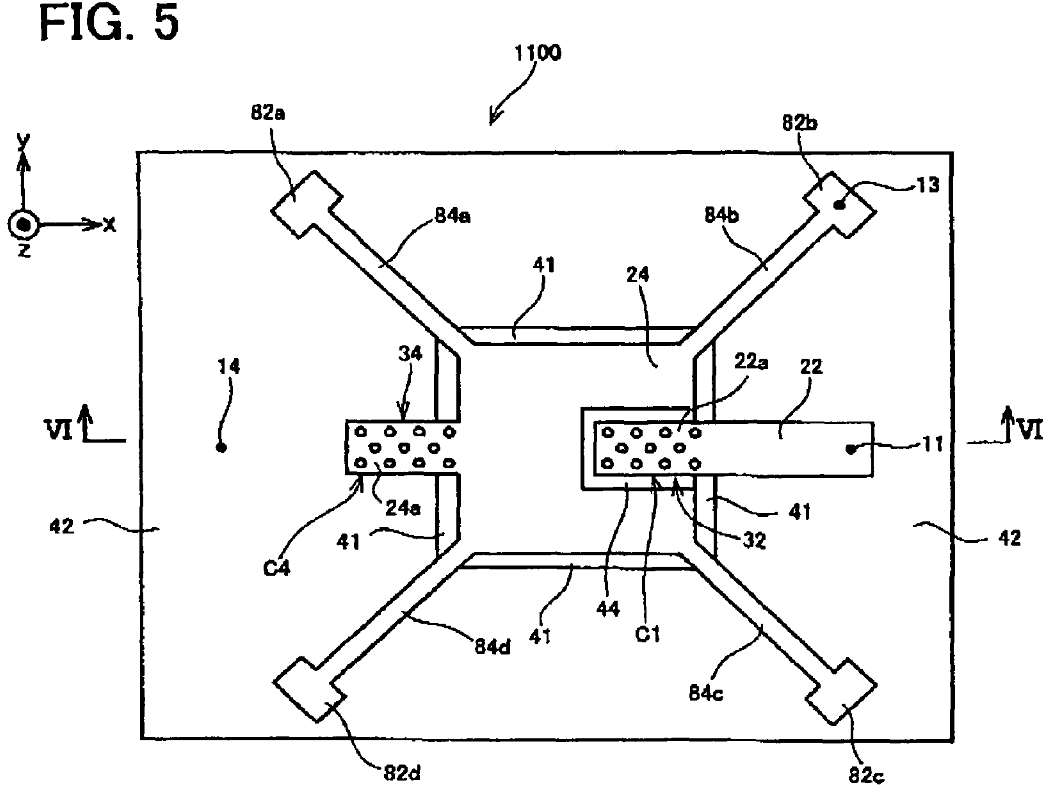
FIG. 5 shows a schematic plan view of an acceleration sensor of a second embodiment.
Figure 6:
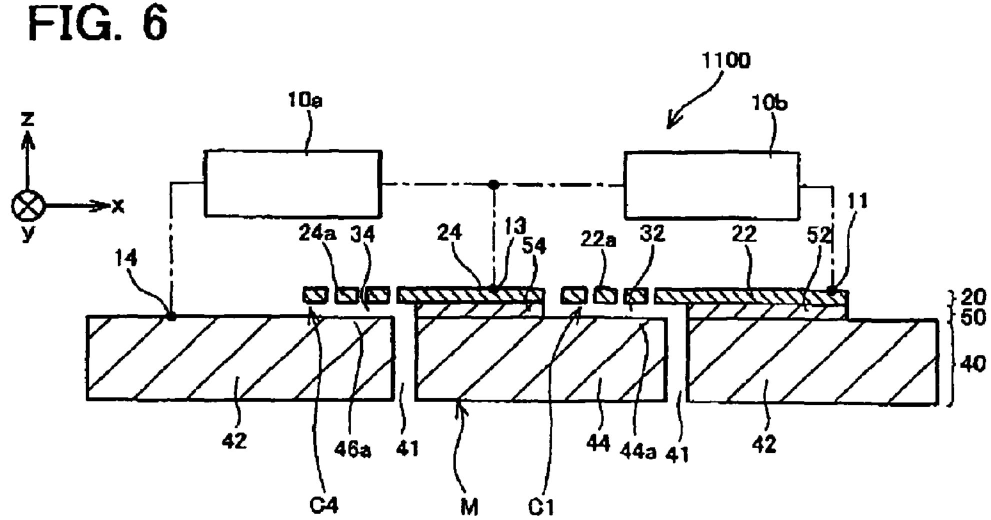
FIG. 6 shows a longitudinal section along line VI-VI of the acceleration sensor of the second embodiment.

FIGS. 5 and 6 schematically show the structure of an acceleration sensor 1100 of a second embodiment. A description might be omitted of components configured identically to those of the first embodiment. The acceleration sensor 1100 performs detection by differentiating the degree of change in electrostatic capacity of a pair of condensers C1 and C4.

As shown in FIGS. 5 and 6, a conductive upper layer 20 of the acceleration sensor 1100 is provided with a first upper portion 22 forming one of electrodes of a condenser C1. The first upper portion 22 extends from a position above a first lower region 44 to a position above a second lower region 42. A first fixing insulating layer 52 is formed between the first upper portion 22 and the second lower region 42. An insulating layer 50 is not formed between the first lower region 44 and a first extending portion 22*a* of the first upper portion 22. A first condenser C1 is formed from the first extending portion 22*a* and a first opposing portion 44*a* in the first lower region 44.

As shown in FIGS. 5 and 6, the conductive upper layer 20 of the acceleration sensor 1100 is further provided with a second upper portion 24 forming one of electrodes of a second condenser C4.

The second upper portion 24 extends from a position above the first lower region 44 to a position above the second lower region 42. A second fixing insulating layer 54 is formed between the second upper portion 24 and the first lower region 44. The insulating layer 50 is not formed between the second lower region 42 and a second extending portion 24*a* of the second upper portion 24. A second condenser C4 is formed from the second extending portion 24*a* and a second opposing portion 46*a* of the second lower region 42.

Spaces 32 and 34 are formed by removing the insulating layer 50 between the extending portions 22*a* and 24*a* and the opposing portions 44*a* and 46*a*.

In the acceleration sensor 1100, the first extending portion 22*a* and the second opposing portion 46*a* are fixed electrodes, and the second extending portion 24*a* and the first opposing portion 44*a* function as movable electrodes. The area of the first condenser C1 and the area of the second condenser C4 are identical. In the acceleration sensor 1100, the spaces 32 and 34 are formed within the same plane as the insulating layer 50, and the distance of the spaces 32 and 34 is substantially identical to the thickness of the insulating layer 50. Since the spaces 32 and 34 are formed by removing the insulating layer 50, the distance of the spaces 32 and 34 can be adjusted to be substantially equal to a thickness of the insulating layer 50. It is possible to accurately adjust the distance of the spaces 32 and 34 to a determined value by adjusting the thickness of the insulating layer 50 in advance. Consequently, it is possible to accurately adjust the electrostatic capacities of the condensers C1 and C4 when acceleration is not being exerted upon the mass M, that is, when the mass M is in a standard location. The acceleration sensor 1100 thus has a structure which can easily be provided with desired characteristics.

The operation of the acceleration sensor 1100 when acceleration is applied thereto will be described using FIG. 6. When acceleration is applied to the acceleration sensor 1100 in the z direction, the mass M is displaced in the z direction to a position of equilibrium by inertial force exerted upon the mass M and by recovery force of beams 84*a*, 84*b*, 84*c* and 84*d* in FIG. 5. When the mass M is displaced, the first opposing portion 44*a* that comprises the first condenser C1, and the second extending portion 24*a* that comprises the second condenser C4 are displaced therewith. If, for example, acceleration is applied in an upwards direction, relative to the paper in FIG. 6, the mass M is displaced downwards relative to the the second lower region 42. As a result, the distance of the first space 32 increases, and the distance of the second space 34 decreases. Since the opposing area of the first condenser C1 and the second condenser C4 are identical, there is an identical degree of change in the electrostatic capacity of both condensers C1 and C4, with positive and negative being inverted. Consequently, by calculating the difference between the electrostatic capacities of both condensers C1 and C4, it is possible to detect only the change in electrostatic capacities with approximately double the degree of sensitivity. The electrostatic capacities of the condensers C1 and C4 at the initial location will be cancelled by calculating the difference between the electrostatic capacities of condensers C1 and C4. The degree of change in electrostatic capacity can be converted to the degree of acceleration, thus acceleration can be measured.

Although it is preferred that the capacities of the condensers C1 and C4 are identical while the acceleration is not applied to the acceleration sensor 1100, it is not essential. When the distances between the electrodes are different between the condensers C1 and C4, or the area of the electrodes are different between the condensers C1 and C4, the capacities of the condensers C1 and C4 may not be identical. In this case, by measuring the difference between the capacities of the condensers C1 and C4 in advance, the influence of the uneven capacities of the condensers C1 and C4 may be cancelled.

Next, a case will be described in which acceleration is measured by providing a condenser capacity detecting circuits 10*a*, 10*b*.

The reference numbers 11, 13, and 14 in FIG. 5 are locations for connecting a condenser capacity detecting circuits 10*a*, 10*b*.

Two condenser capacity detecting circuits 10*a*, 10*b* are used in the present embodiment. Once of the condenser capacity detecting circuits 10*b* is connected between the first upper portion 22 and the end 82*b* of the beam 84*b* (11-13). The electrostatic capacity of the first condenser C1 can be detected using this condenser capacity detecting circuit 10*b*. The other condenser capacity detecting circuit 10*a* is connected between the second lower region 42 and the end 82*b* of the beam 84*b* (13-14). The electrostatic capacity of the second condenser C4 can be detected using this condenser capacity detecting circuit 10*a*.

Figure 7:
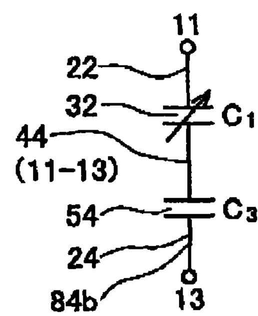
FIG. 7 shows a equivalent circuit of the acceleration sensor of the second embodiment.

In the present embodiment, a high frequency (1 KHz to 100 MHz) is applied by means of an oscillating circuit to the end 82*b* of the beam 84*b*. Thereupon, composite electrostatic capacity between the first upper portion 22 and the end 82*b* of the beam 84*b* (11-13), and composite electrostatic capacity between the second lower region 42 and the end 82*b* of the beam 84*b* (13-14) can be detected simultaneously. FIG. 7 shows an equivalent circuit of the composite capacity detected by the condenser capacity detecting circuits 10*a*, 10*b*. C1 is the capacity of the first condenser, C4 is the capacity of the second condenser, and C3 is electrostatic capacity of a condenser formed by the second upper portion 24, the first insulating layer 54, and the first lower region 44. The capacity C3 is a fixed capacity that does not change in response to displacement of the mass M. The effects of the capacity C3 can be removed by providing a circuit for its removal. By calculating the difference in electrostatic capacity detected by the two condenser capacity detecting circuits 10*a*, 10*b*, and by offsetting the electrostatic capacity of the initial location, it is possible to detect only the change in electrostatic capacity with approximately double the degree of sensitivity.

Third Embodiment

Figure 8:
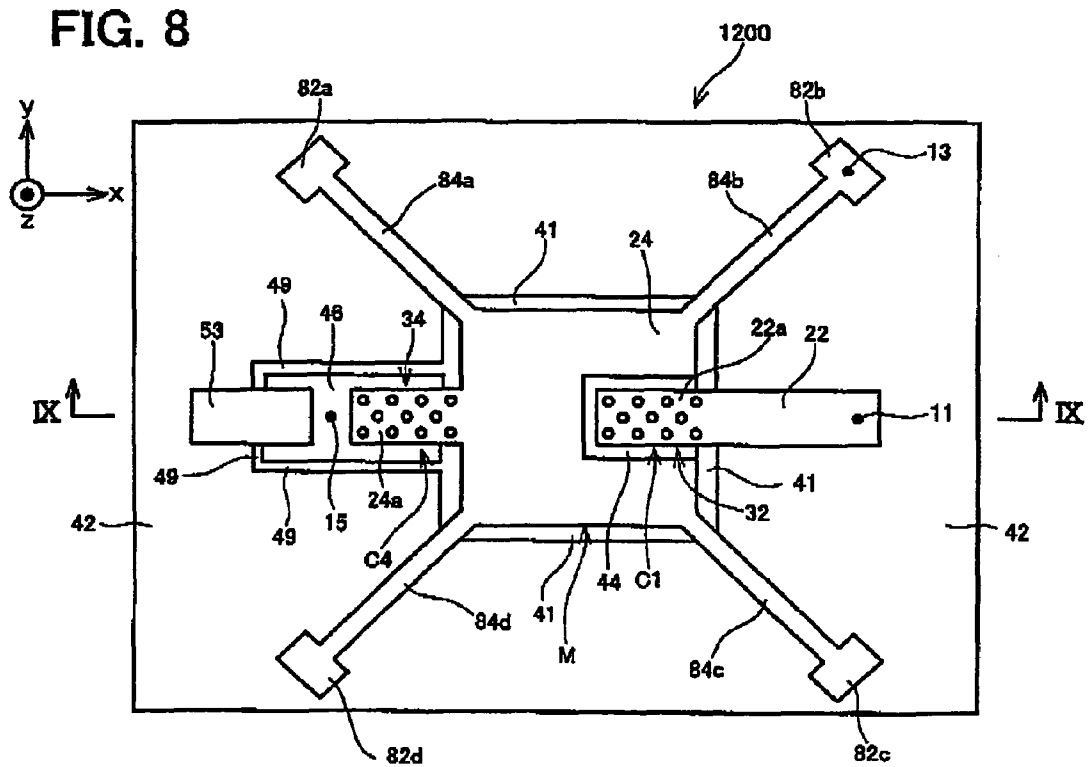
FIG. 8 shows a schematic plan view of an acceleration sensor of a third embodiment.
Figure 9:
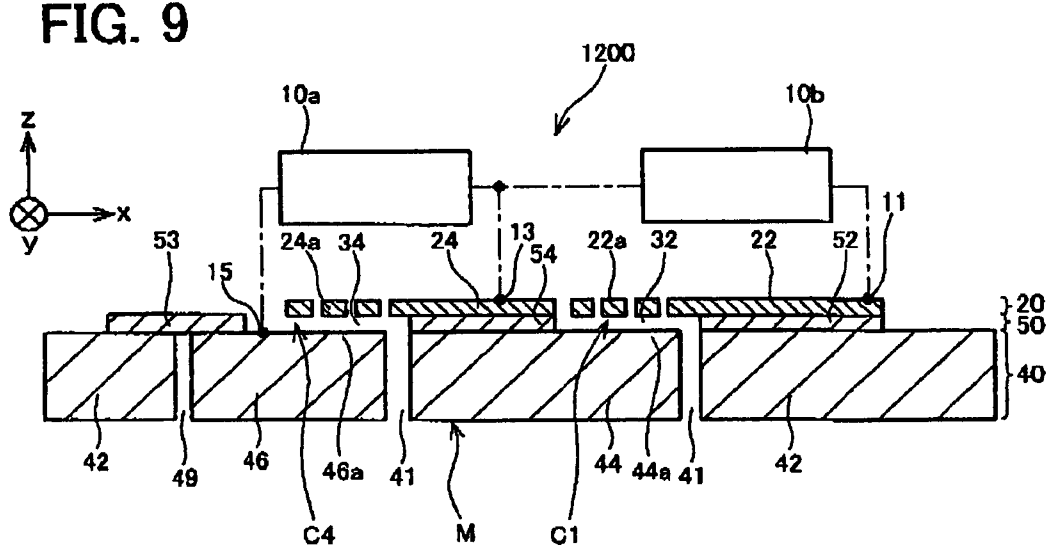
FIG. 9 shows a longitudinal section along a line IX-IX of the acceleration sensor of the third embodiment.

FIGS. 8 and 9 schematically show the structure of an acceleration sensor 1200 of a third embodiment. The acceleration sensor 1200 is a variant of the acceleration sensor 1100 of the second embodiment.

In the acceleration sensor 1200, as shown in FIGS. 8 and 9, a region that includes a second opposing portion 46*a*—this being opposite a second extending portion 24*a* of a second upper portion 24—(hereafter, this region will be termed a second opposing lower region 46) is insulated from a remaining portion of a second lower region 42. This insulation is attained by means of a slit 49 that penetrates a conductive lower layer 40. The slit 49 is connected with a dividing groove 41.

As shown in FIGS. 8 and 9, the second opposing lower region 46 is fixed to the second lower region 42 via a portion 53 of an insulating layer 50. Although the second opposing lower region 46 is electrically separated from the second lower region 42 by the slit 49, it is mechanically fixed thereto via the portion 53 of the insulating layer 50. Consequently, the second opposing lower region 46 is not displaced with respect to the second lower region 42 in response to acceleration being applied. The second opposing lower region 46 functions as a fixed electrode.

Next, a case will be described in which acceleration is measured by providing a condenser capacity detecting circuits 10*a*, 10*b*. The reference numbers 11, 13, and 15 shown in FIG. 8 are locations for connecting the condenser capacity detecting circuits 10*a*, 10*b*.

Two condenser capacity detecting circuits 10*a*, 10*b* are used in the present embodiment. One of the condenser capacity detecting circuits 10*b* is connected between a first upper portion 22 and an end 82*b* of a beam 84*b* (11-13). The electrostatic capacity of a first condenser C1 can be detected using this condenser capacity detecting circuit 10*b*. The other condenser capacity detecting circuit 10*a* is connected between the second upper portion 24 and the second opposing lower region 46 (13-15). The electrostatic capacity of a second condenser C4 can be detected using this condenser capacity detecting circuit 10*a*.

In this embodiment, as in the second embodiment, calculating the difference in electrostatic capacity detected by the two condenser capacity detecting circuits 10*a*, 10*b* makes it possible to detect only the degree of change in electrostatic capacity.

In the acceleration sensor 1200, the second opposing lower region 46 is electrically separated from the second lower region 42 by the slit 49. The effects of electrical noise etc. on the second lower region 42 can thus be prevented from affecting the measurements of the condenser capacity detecting circuit 10*a*. Acceleration can thus be measured precisely.

Figure 10:
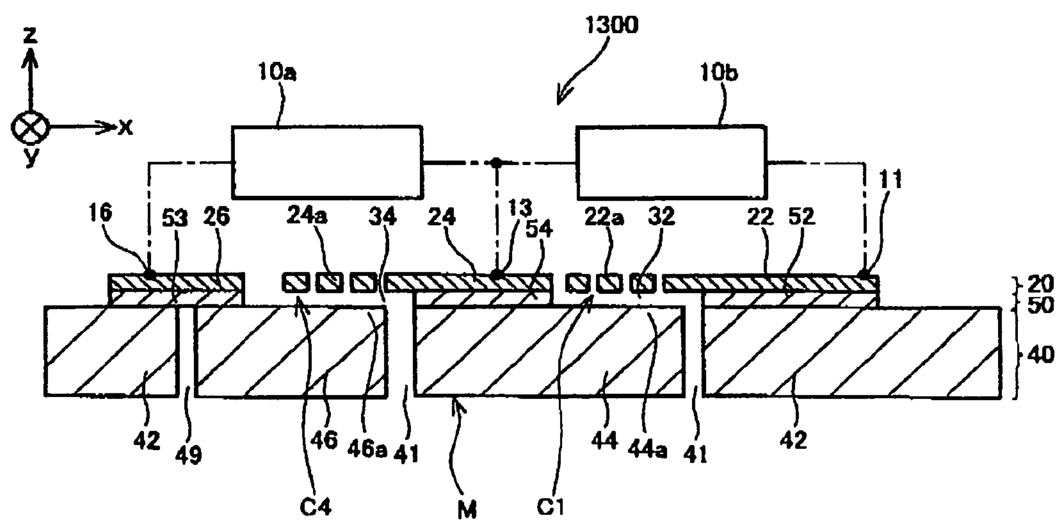
FIG. 10 shows a variant of the third embodiment.

Further, in the case where it is difficult to connect the condenser capacity detecting circuit 10*a* to the second opposing lower region 46, the variation shown in FIG. 10 is also possible. In this case, the condenser capacity detecting circuit 10*a* is connected with a portion 26 of a conductive upper layer 20 formed on the portion 53 of the insulating layer 50. In this structure, the condenser capacity detecting circuit 10*a* also detects combined capacity formed by the portion 26 of the conductive upper layer 20, the portion 53 of the insulating layer 50, and the second opposing lower region 46. However, this combined capacity can be removed by utilizing a suitable sensor output processing circuit.

In this variation, the second opposing lower region 46 is mechanically fixed by the portion 53 of the insulating layer 50 and by the portion 26 of the conductive upper layer 20. Consequently, its mechanical strength can be increased. Furthermore, all the connecting points 11, 13, 16 of the condenser capacity detecting circuits 10*a*, 10*b* can be exposed above the conductive upper layer 20, and consequently processes such as wire bonding etc. become simpler. In this structure, signal wires can be retrieved easily.

Fourth Embodiment

Figure 11:
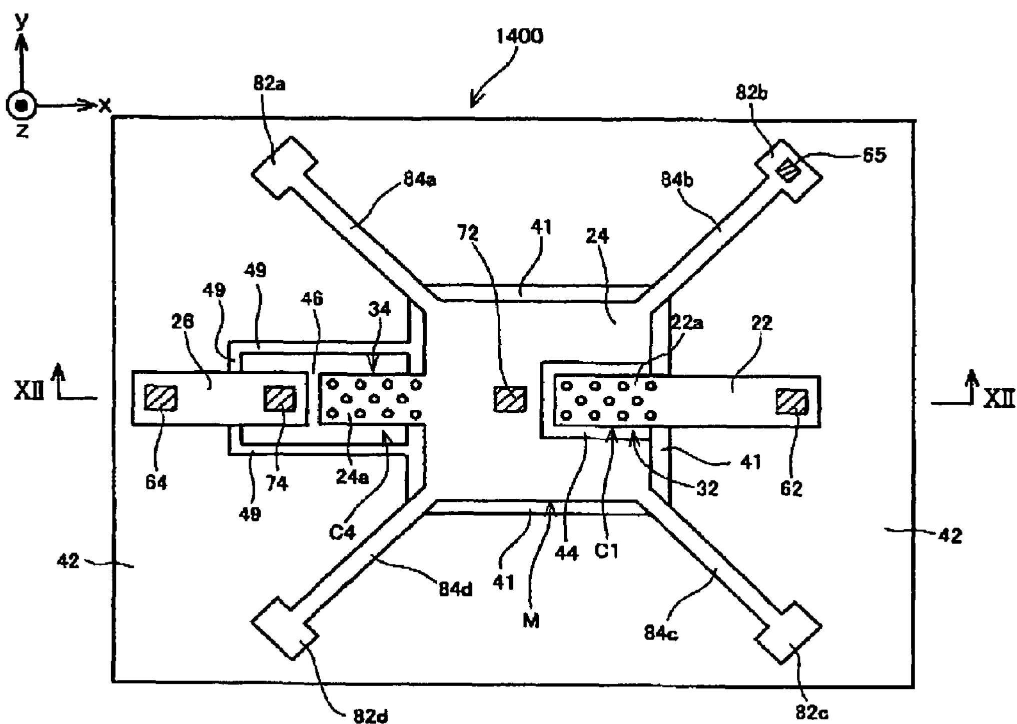
FIG. 11 shows a schematic plan view of an acceleration sensor of a fourth embodiment.
Figure 12:
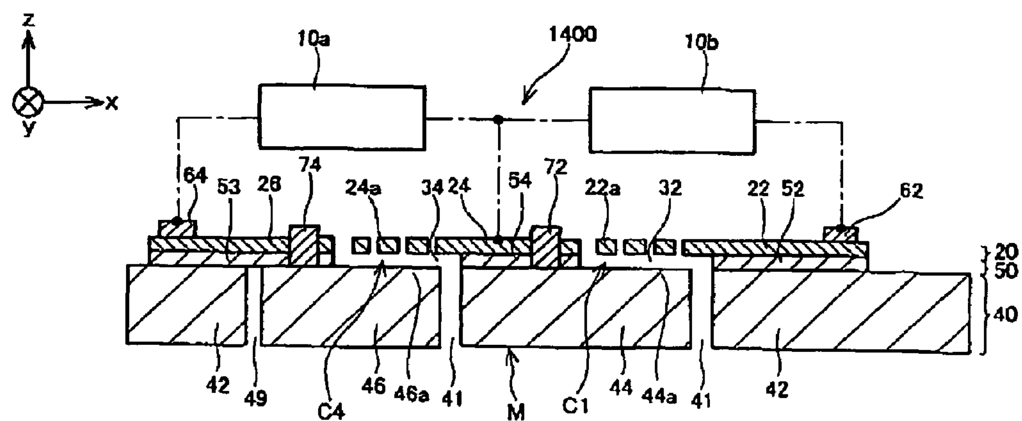
FIG. 12 shows a longitudinal section along a line XII-XII of the acceleration sensor of the fourth embodiment.

FIGS. 11 and 12 schematically show the structure of an acceleration sensor 1400 of a fourth embodiment.

In the acceleration sensor 1400, as shown in FIG. 12, a second upper portion 24 and a first lower region 44 are connected by a first inserted electrode 72. The first inserted electrode 72 is inserted into a contact hole penetrating a first insulating layer 54 and the second upper portion 24. Furthermore, a second inserted electrode 74 connects a second opposing lower region 46 and a portion 26 of a conductive upper layer 20 to which the second opposing lower region 46 is fixed. The second inserted electrode 74 is inserted into a contact hole that penetrates a portion 53 of an insulating layer 50 and the portion 26 of the conductive upper layer 20.

Due to the first inserted electrode 72, measurements are not affected by the capacity that will be generated by the second upper portion 24, the first insulating layer 54 and the first lower region 44. Furthermore, due to the second inserted electrode 74, measurements are not affected by the capacity that will be generated by the portion 26 of the upper conductive layer 20, the portion 53 of the insulating layer 50 and the second opposing lower region 46.

As shown in FIGS. 11 and 12, a first detecting electrode 62, a second detecting electrode 64, and a pad 65 used in an oscillating circuit are locations for connecting a condenser capacity detecting circuit.

Two condenser capacity detecting circuits 10*a*, 10*b* are used in the present embodiment. One of the condenser capacity detecting circuits 10*b* is connected between the first detecting electrode 62 and the pad 65 used in the oscillating circuit. The electrostatic capacity of a first condenser C1 can be detected using this condenser capacity detecting circuit 10*b*. The other condenser capacity detecting circuit 10*b* is connected between the second detecting electrode 64 and the pad 65 used in the oscillating circuit. The electrostatic capacity of a second condenser C4 can be detected using this condenser capacity detecting circuit 10*a*. In the present embodiment, also, calculating the difference in electrostatic capacities detected by the two condenser capacity detecting circuits 10*a*, 10*b* makes it possible to detect only the degree of change in electrostatic capacity of the condensers C1 and C4.

Electrostatic capacity between the pad 65 used in the oscillating circuit and the first detecting electrode 62 is detected by applying a high frequency to the pad 65 used in the oscillating circuit. Due to the first inserted electrode 72, capacity that will be caused by the first insulating layer 54 does not affect the measurements of this electrostatic capacity. Consequently, it is possible to detect only the degree of change in electrostatic capacity of the first condenser C1.

Furthermore, electrostatic capacity between the pad 65 used in the oscillating circuit and the second detecting electrode 64 is detected at the same time as the above. Due to the second inserted electrode 74, capacity that will be caused by the portion 53 of the insulating layer 50 does not affect the measurement of this electrostatic capacity. Consequently, it is possible to detect only the degree of change in electrostatic capacity of the second condenser C4. It is thus possible to accurately detect only the degree of change in electrostatic capacities of the first condenser C1 and the second condenser C4, and to thus accurately measure acceleration that has been applied.

Figure 13:
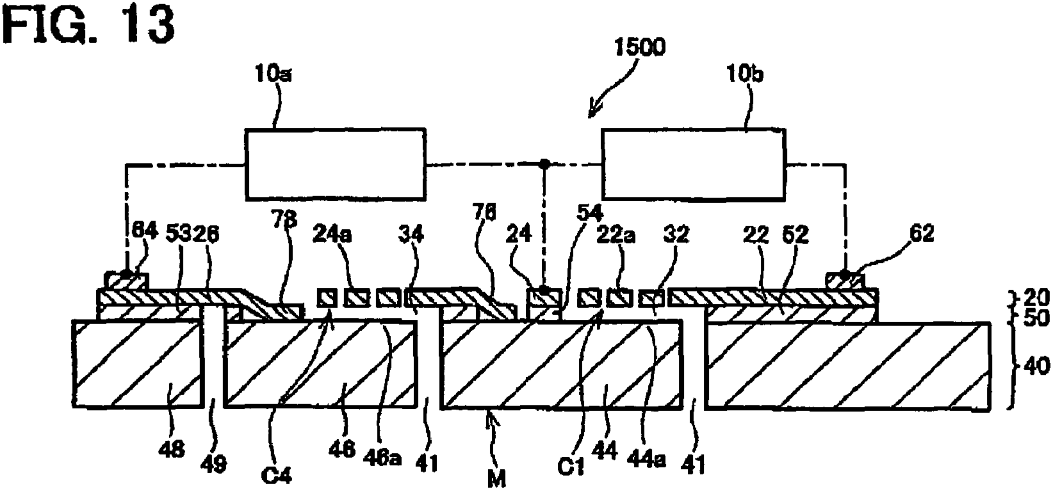
FIG. 13 shows a variant of the fourth embodiment.

FIG. 13 shows a cross-sectional view of essential parts of an acceleration sensor 1500, this being a variant of the fourth embodiment. In the acceleration sensor 1500, connection is not performed by means of an inserted electrode 72 and 74 in FIG. 12. Instead, the second upper portion 24 is directly connected with the first lower region 44 via a bent portion 76. Furthermore, the portion 26 of the conductive upper layer 20 is directly connected with the second opposing lower region 46 via a bent portion 78.

The following method can be used to realize the present embodiment: for example, a slit comprising three sides of a square is formed in a portion of the second upper portion 24 and, by causing the bend portion 76 of the second upper portion 24 to bend from the remaining side of the square, the bend portion 76 of the second upper portion 24 and the first lower region 44 can be made to connect. In this case, the insulating layer 50 below the slit is removed by means of etching after the slit has been formed. Thereupon, the bend portion 76 of the second upper portion 24 surrounding the slit will bend naturally from the remaining side and make contact with the first lower region 44. Manufacture is thus radically simplified. Further, if the connecting location is gripped and a determined voltage is applied thereto after bending, silicon crystals at the connecting location are welded and the connection is thus strong.

Moreover, acceleration can be measured using methods differing from the method used with the condenser capacity detecting circuit described above. One of these methods will be described using the fourth embodiment.

The end 82*b* of the beam 84*b* is earthed, and the voltage of the mass is fixed to OV. A determined voltage can be applied to each of the detecting electrodes 62 and 64 via a switch. Operating the switch connects the detecting electrodes 62 and 64 with a switched capacitor circuit provided with the condenser, an operational amplifier, and an oscillator.

A determined charge is stored within the first condenser C1 and the second condenser C4 if the switch is on in an initial location in which acceleration is not being applied to the mass. Next, the switch is turned off before acceleration is applied to the mass, acceleration is applied to the mass, and the electrostatic capacity of each condenser changes if there is a change in the distance between the electrodes of the condensers. A differential amplifier circuit formed in the switched capacitor circuit calculates the size of electrostatic capacity of each condenser in proportion to voltage. The acceleration that has been applied can be measured from the difference in voltage detected.

Moreover, the electrostatic capacity could instead be detected using a 'charge amplifier' type.

Moreover, in the displacement sensor described above, the spaces 32, 34 for forming the condensers C1, C2, C4 and the spaces 36, 38 for forming the beams 84*a*, 84*b*, 84*c*, 84*d* are formed by removing the insulating layer 50 completely. However, the spaces 32, 34 and spaces 36, 38 may be formed by partially removing the insulating layer 50 in its thickness. It is important to provide a space that permits the electrodes of the condenser to displace in the direction of the thickness. It is also important to provide a space that permits the beams 84*a*, 84*b*, 84*c*, 84*d* to bend in the direction of the thickness.

For example, a portion of the insulating layer 50 can be left without being removed at the surface of the first opposing portion 44*a* constituting the condensers C1. Even if a strong force is applied to the condenser C1 and the first extending portion 22*a* contacts the first opposing portions 44*a*, the condenser C1 can be prevented from short circuited.

Instead of leaving thin insulating film(s) at the surface of the condenser C1, C2, C3, insulating film(s) for preventing short circuit can be formed at the surface of the condenser C1, C2, C3 after removing the insulating layer 50 completely. A silicon oxide or silicon nitride etc may be used forming the insulating film separately.

In following embodiments, the insulating layer is removed completely. However, in the following embodiments, a portion of the insulating layer may be left or insulating film may be formed separately.

The thickness of the insulating film may be reduced to be very thin comparing to the thickness of the insulating layer. Therefore it is possible to suppress the capacity of the condenser from being influenced by the existence of the insulating film. It is also possible to suppress variations of the capacity of the condenser due to the variations of the thickness of the insulating film.

In the type of differential sensor, the thickness of the insulating films may be changed from a predetermined thickness. As long as the thickness of the insulating films of the condensers are identical or nearly identical, the acceleration sensor may be maintained in a good condition.

Fifth Embodiment

A method for manufacturing an acceleration sensor with an approximately identical structure to that of the acceleration sensor 1400 shown in FIG. 12 will be described with reference to FIGS. 14 to 21.

Figure 14:
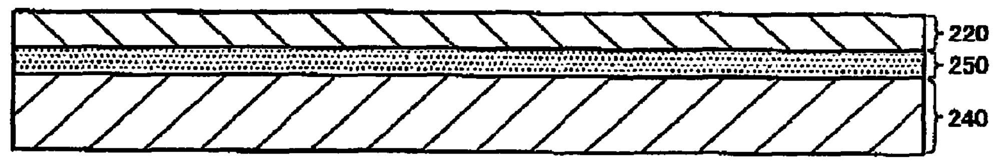
FIG. 14 shows a manufacturing process (1) of an acceleration sensor of a fifth embodiment.

As shown in FIG. 14, an SOI (Silicon on Insulator) base is prepared from a monocrystal conductive lower layer 240, an insulating layer 250 formed above the conductive lower layer 240, and a conductive upper layer 220 formed above the insulating layer 250 and formed from monocrystal.

Figure 15:
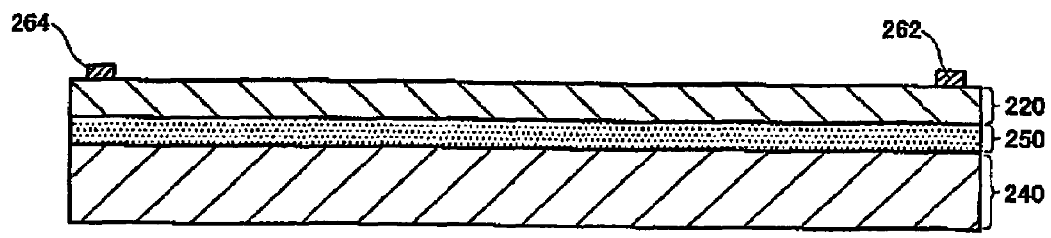
FIG. 15 shows a manufacturing process (2) of the acceleration sensor of the fifth embodiment.

Next, as shown in FIG. 15, a layer is formed above the conductive upper layer 220, this layer being formed from a conductive material such as aluminum, titanium, etc. and being formed using a method such as, for example, vapor deposition or patterning. Thereupon, photolithography and etching techniques (wet etching, dry etching, etc.) are used to form a first detecting electrode 262 and a second detecting electrode 264 at determined locations.

Figure 16:
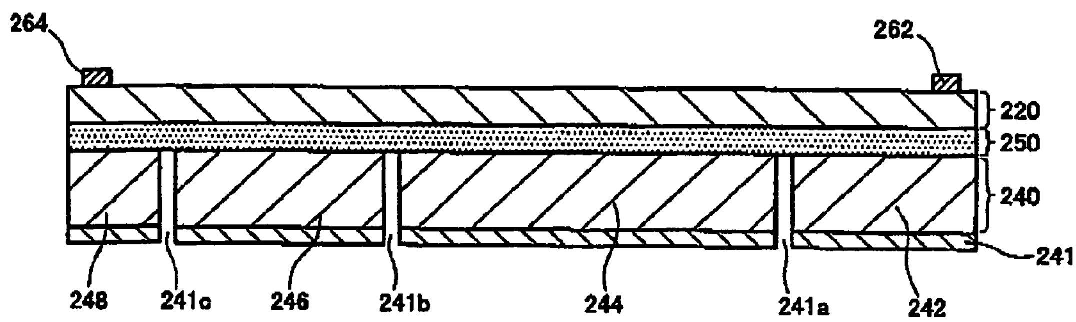
FIG. 16 shows a manufacturing process (3) of the acceleration sensor of the fifth embodiment.

Next, as shown in FIG. 16, an oxide layer 241 is formed at a bottom surface of the conductive lower layer 240, a patterning is performed of the oxide layer 241, and, from openings therein, trenches 241*a*, 241*b*, and 241*c* that pass through the conductive lower layer 240 are formed using a method such as, for example, anisotropic etching (using, for example, potassium hydroxide, etc.) or RIE (Reactive Ion Etching). At this juncture, the anisotropic etching performed on the conductive lower layer 240 can be completed at the face contacting the insulating layer 250. Consequently, the trenches 241*a*, 241*b*, and 241*c* can be formed accurately.

Figure 17:
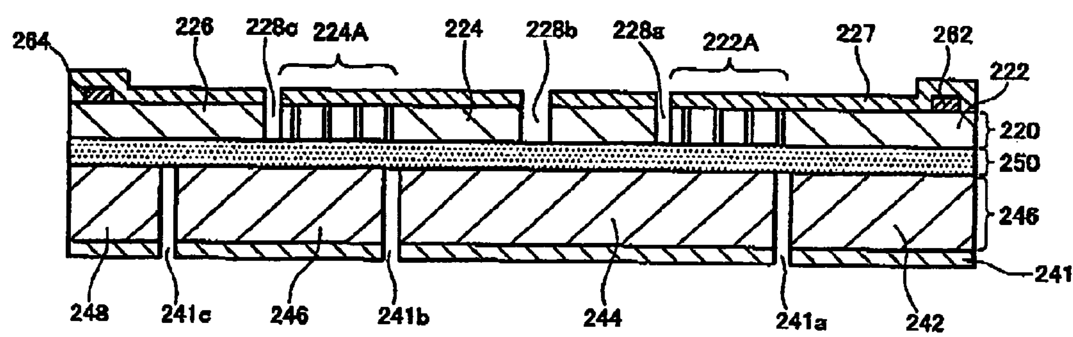
FIG. 17 shows a manufacturing process (4) of the acceleration sensor of the fifth embodiment.

Next, as shown in FIG. 17, a first masking material 227 is formed by patterning above the conductive upper layer 220 and, from openings therein, trenches 228*a*, 228*b*, and 228*c* that penetrate the conductive upper layer 220 are formed by means of anisotropic etching. Before the patterning of the first masking material 227, etching holes are formed at portions (222A and 224A) of the conductive upper layer 220 at locations corresponding to where the insulating layer 250 will be removed in a later process.

Figure 18:
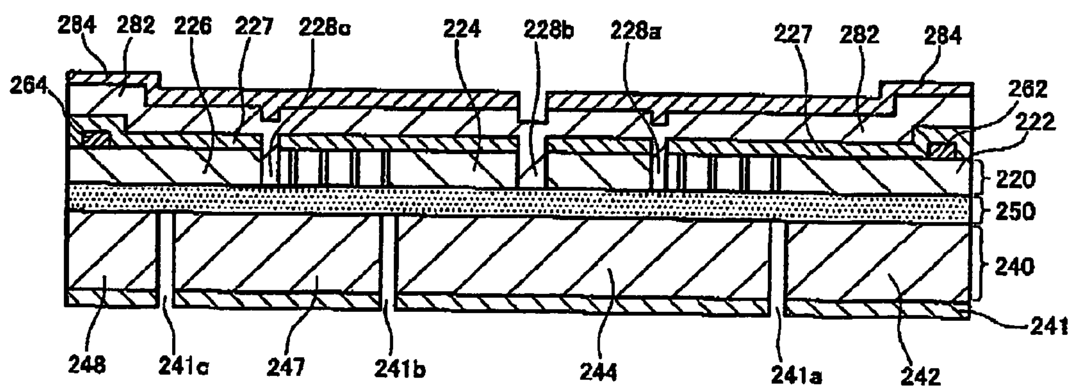
FIG. 18 shows a manufacturing process (5) of the acceleration sensor of the fifth embodiment.

Next, as shown in FIG. 18, a method such as, for example, CVD (Chemical Vapor Deposition) is used until an oxide layer 282 is formed that covers the first masking material 227 and the trenches 228*a*, 228*b*, and 228*c*. A second masking material 284 is applied above the oxide layer 282, and the second masking material 284 is removed at the location corresponding to the trench 228*b*.

Figure 19:
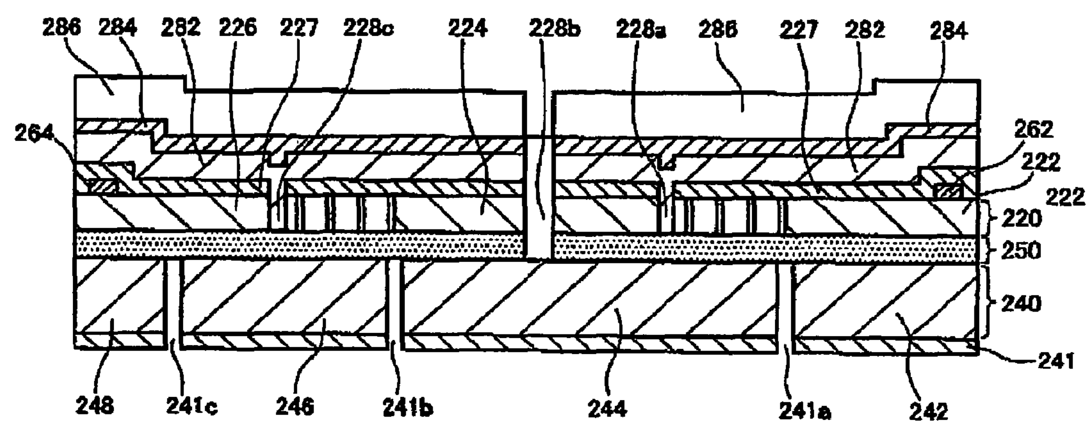
FIG. 19 shows a manufacturing process (6) of the acceleration sensor of the fifth embodiment.

Next, as shown in FIG. 19, the oxide layer 282 filling the trench 228*b* is removed, and a conductive polycrystal silicon layer 286 is then formed in the trench 228*b* and above the second masking material 284. The polycrystal silicon layer 286 can be formed from any conductive metal such as, for example, aluminum, etc.

Figure 20:
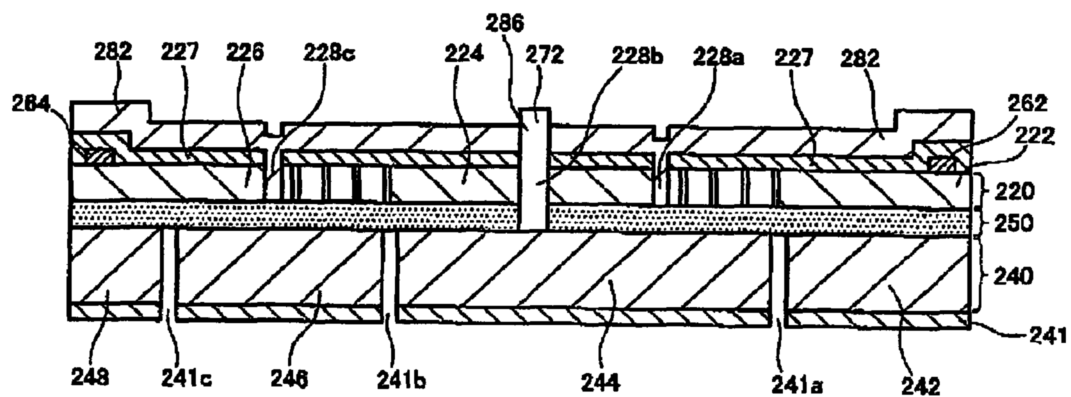
FIG. 20 shows a manufacturing process (7) of the acceleration sensor of the fifth embodiment.

Next, as shown in FIG. 20, the polycrystal silicon 286 and the second masking material 284 are removed using the lift-off method, leaving the polycrystal silicon layer 286 in the trench 228*b*. The polycrystal silicon layer 286 in the trench 228*b* forms a first inserted electrode 272 that connects a portion 244 of the conductive lower layer 240 and a portion 224 of the conductive upper layer 220.

Figure 21:
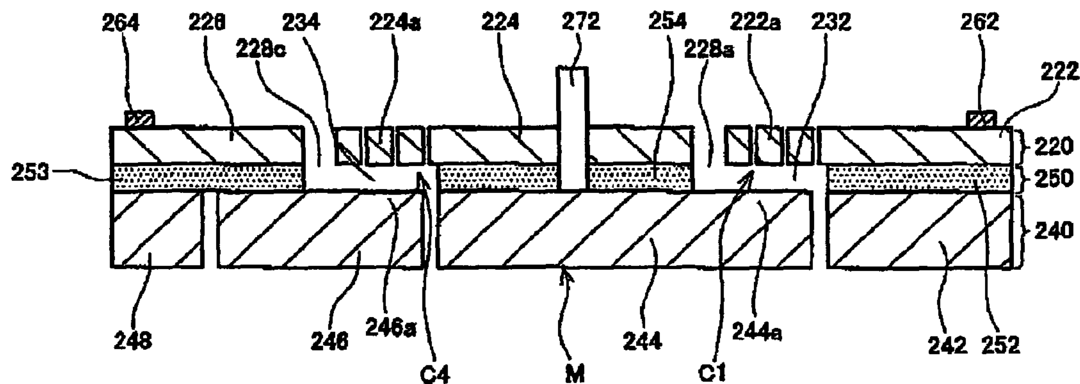
FIG. 21 shows a manufacturing process (8) of the acceleration sensor of the fifth embodiment.

Next, as shown in FIG. 21, removal by etching is performed of the oxide layer 282 and the first masking material 227 using, optionally, hydrofluoric acid for removing etching of the silicon oxide layer. As this etching process occurs, the hydrofluoric acid simultaneously enters via the trenches 228*a* and 228*c* and an etching hole formed in a portion of the conductive upper layer 220, so that a portion of the insulating layer 50 therebelow is also removed. This results in the formation of a first space 232 and a second space 234. The first condenser C1 and second condenser C4 are formed in this manner.

According to the aforementioned manufacturing method, the insulating layer 250 that has a determined thickness is removed by etching, thus forming the first space 232 and second space 234. It is consequently easy to form the distance between the electrodes of the condensers C1, C4 such that this distance is constant, and it is thus possible to stably manufacture acceleration sensors provided with determined characteristics. Further, the smaller the distance between the electrodes of the condensers C1, C4, the greater the electrostatic capacity of the condensers C1, C4. It is thus possible to obtain a sensor in which, as the distance between the electrodes of the condensers C1, C4 is smaller, there is a greater degree of change in electrostatic capacity relative to the same degree of displacement. That is, a sensor can be obtained in which, the smaller the distance between the electrodes of the condensers C1, C4, the greater the sensitivity in measuring. According to the aforementioned manufacturing method, it is easy to obtain an acceleration sensor in which the distance between the electrodes of the condensers C1, C4 is small by first preparing a thin insulating layer 250. It is thus possible to obtain an acceleration sensor in which the characteristics of the sensor are stable, and in which the sensor is extremely sensitive.

Moreover, when the first space 232 and the second space 234 are formed, a thin portion of the insulating layer 250 directly contacting the conductive upper layer 220 and/or conductive lower layer 240 can be left. The thin portion so left provides insulating films for preventing short circuit of the condenser. The thin insulating films also can be formed on the surface of the conductive upper layer 220 and/or conductive lower layer 240 for forming the condenser C1, C4 by using CVD method after completely removing the insulating layer 250.

It is possible to stable the thickness of the thin insulating films by controlling the removing condition of the insulating layer or the condition of performing CVD method.

Sixth Embodiment

Figure 22:
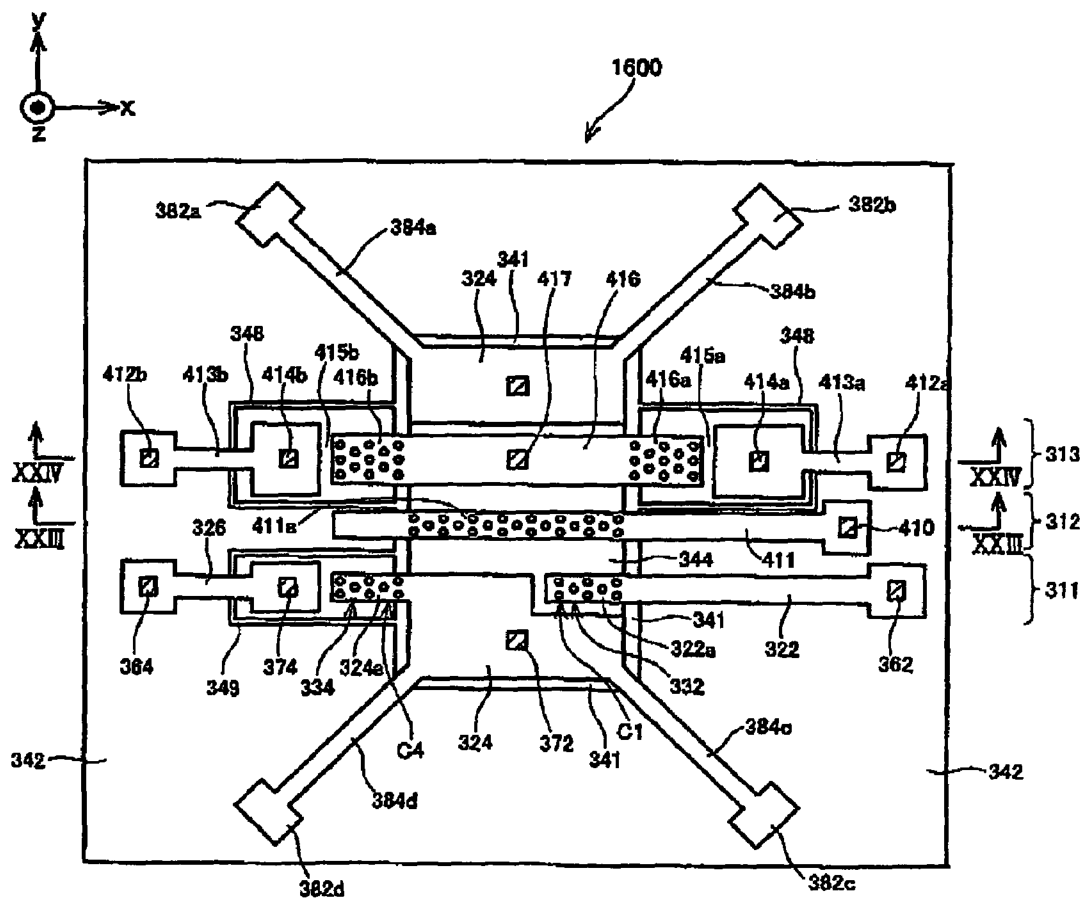
FIG. 22 shows a schematic plan view of an acceleration sensor of a sixth embodiment.

FIG. 22 schematically shows a plan view of an acceleration sensor 1600 of a sixth embodiment. The acceleration sensor 1600 detects acceleration in a z direction. In the acceleration sensor 1600, a controlling region has been added to the acceleration sensor 1400 of the fourth embodiment. The acceleration sensors of the first to fourth embodiments were a type in which acceleration is measured using the distance between electrodes of a condenser, this distance changing when mass has been displaced in response to acceleration being applied. In the acceleration sensor 1600 of the present embodiment, voltage is applied to a controlling electrode of a controlling region so as to resist acceleration that is applied and to thereby maintain a constant distance between electrodes of a condenser. Acceleration is measured on the basis of the amount of voltage applied to the controlling electrode.

A region 311 is a detecting region for detecting acceleration, and has a configuration equivalent to the acceleration sensor 1400 of the fourth embodiment. 312 is a first controlling region, and 313 is a second controlling region. Since the configuration of the detecting region 311 resembles the acceleration sensor 1400 of the fourth embodiment, a description thereof is omitted.

Figure 23:
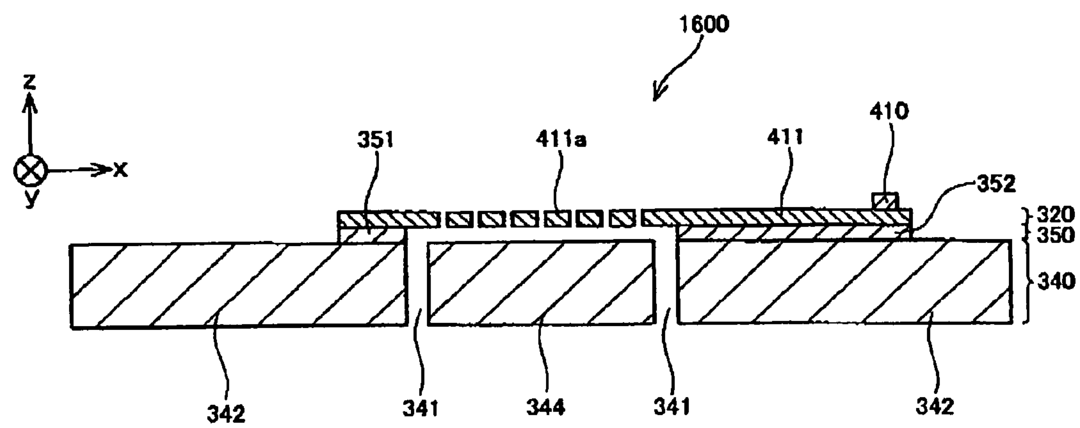
FIG. 23 shows a longitudinal section along a line XXIII-XXIII of the acceleration sensor of the sixth embodiment.

A longitudinal section of the first controlling region 312 is shown in FIG. 23 (this corresponds to the line XXIII-XXIII in FIG. 22). A third upper portion 411 intersecting an area above a first lower region 344 is formed on a conductive upper layer of the first controlling region 312. The third upper portion 411 links two opposing parts of a second lower region 342 with the first lower region 344 being interposed therebetween. An insulating layer is not formed between the first lower region 344 and a third extending portion 411*a* of the third upper portion 411. Third fixing insulating layers 351 and 352 are formed between the third upper portion 411 and the second lower region 342. The third upper portion 411 is fixed to the second lower region 342 via the third fixing insulating layers 351 and 352. The insulating layer between the third extending portion 411*a* and the first lower region 344 is removed by means of etching. The third upper portion 411 is connected with a first controlling electrode 410.

Figure 24:
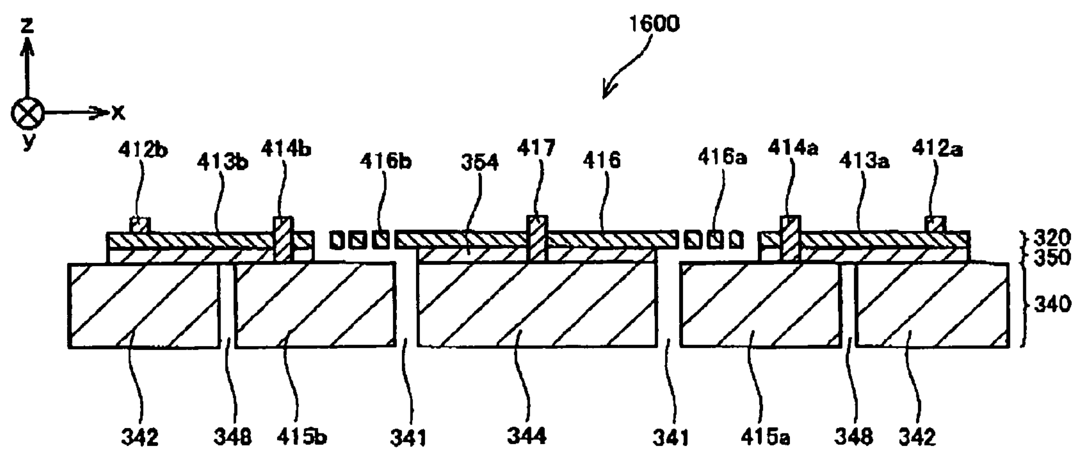
FIG. 24 shows a longitudinal section along a line XXIV-XXIV of the acceleration sensor of the sixth embodiment.

The configuration of the second controlling region 313 is symmetrical in the left-right direction of the page. A longitudinal section of the second controlling region 313 is shown in FIG. 24 (this corresponds to the line XXIV-XXIV in FIG. 22).

A fourth upper portion 416 is formed above a fourth insulating layer 354 above the first lower region 344, on a conductive upper layer of the second controlling region 313. The fourth upper portion 416 extends above two opposing parts of the second lower region 342 with the first lower region 344 being interposed therebetween. The portions that are extending are termed extending portions 416*a* and 416*b*.

Second controlling opposing lower regions 415*a* and 415*b*, these being opposite the extending portions 416*a* and 416*b*, are electrically insulating from the remaining portion of the second lower region 342 by a dividing groove 341 and a slit 348. An insulating layer is not formed between the extending portions 416*a* and 416*b* and the second controlling opposing lower regions 415*a* and 415*b*. The fourth insulating layer 354 is formed between the fourth upper portion 416 and the first lower region 344.

The second controlling opposing lower regions 415*a* and 415*b* are connected with second controlling electrodes 412*a* and 412*b* via second controlling inserted electrodes 414*a* and 414*b* and via second controlling extending electrodes 413*a* and 413*b*. The second controlling opposing lower region 415*a* and 415*b* are fixed mechanically to the second lower region 342 by the second controlling extending electrodes 413*a* and 413*b* and the insulating layer.

Next, the operation of the acceleration sensor 1600 will be described using FIGS. 23 and 24.

When acceleration is applied to the acceleration sensor 1600 in an upwards direction relative to the page, inertial force exerted upon the mass and recovery force of beams 384*a*, 384*b*, 384*c*, and 384*d* attempts to displace the mass downwards to a position of equilibrium. At this juncture, a determined voltage is applied to the first controlling electrode 410. As shown in FIG. 23, when the determined voltage is applied to the first controlling electrode 410, electrostatic attraction operates between the third extending portion 411*a* and the first lower region 344, and the mass remains in the initial location. It is possible to determine that the mass is remaining in the initial location from the fact that there is no change in the distance between the electrodes of the condenser of the detecting region 311. The voltage applied to the first controlling electrode 410 is adjusted so that the distance between the electrodes will not change. At this juncture, the square of amount of voltage applied to the first controlling electrode 410 is in proportion to the amount of acceleration applied. Consequently, it is possible to measure acceleration from the amount of voltage that is applied to the first controlling electrode 410.

When acceleration is applied in a downwards direction relative to the page, the inertial force exerted upon the mass and the remover force of the beams 384*a*, 384*b*, 384*c*, and 384*d* attempts to displace the mass upwards to a position of equilibrium. At this juncture, a determined voltage is applied to the second controlling electrodes 412*a* and 412*b*. As shown in FIG. 24, when the determined voltage is applied to the second controlling electrodes 412*a* and 412*b*, electrostatic attraction operates between the fourth extending portions 416*a* and 416*b* and the second controlling opposing lower regions 415*a* and 415*b*, and the first lower region 344 remains in the initial location. It is possible to determine that the mass portion is remaining in the initial location from the fact that there is no change in the distance between the electrodes of the condenser of the detecting region 311. The voltage applied to the second controlling electrodes 412*a* and 412*b* is adjusted so that the distance between the electrodes will not change. At this juncture, it is possible to measure the amount of acceleration from the amount of voltage applied to the second controlling electrodes 412*a* and 412*b*. Moreover, the second controlling region 313 is symmetrical in the left-right direction so as to prevent the mass from rotating.

In the case of the acceleration sensor 1600 provided with the controlling regions 312 and 313, the dynamic range of the sensor is not restricted to the distance between the electrodes of the condenser. Consequently, it is possible to measure acceleration over a wide region. Further, it is easy for errors to occur when beams bend to a large extent. However, this situation does not occur in the aforementioned configuration, and consequently accurate measurement is possible.

In the cases described above, the beams in each embodiment extended symmetrically from corners of the mass, with the mass being at the center. However, the beams are not restricted to these examples, and may equally well be formed, for example, in the directions shown in FIG. 25.

Figure 25:
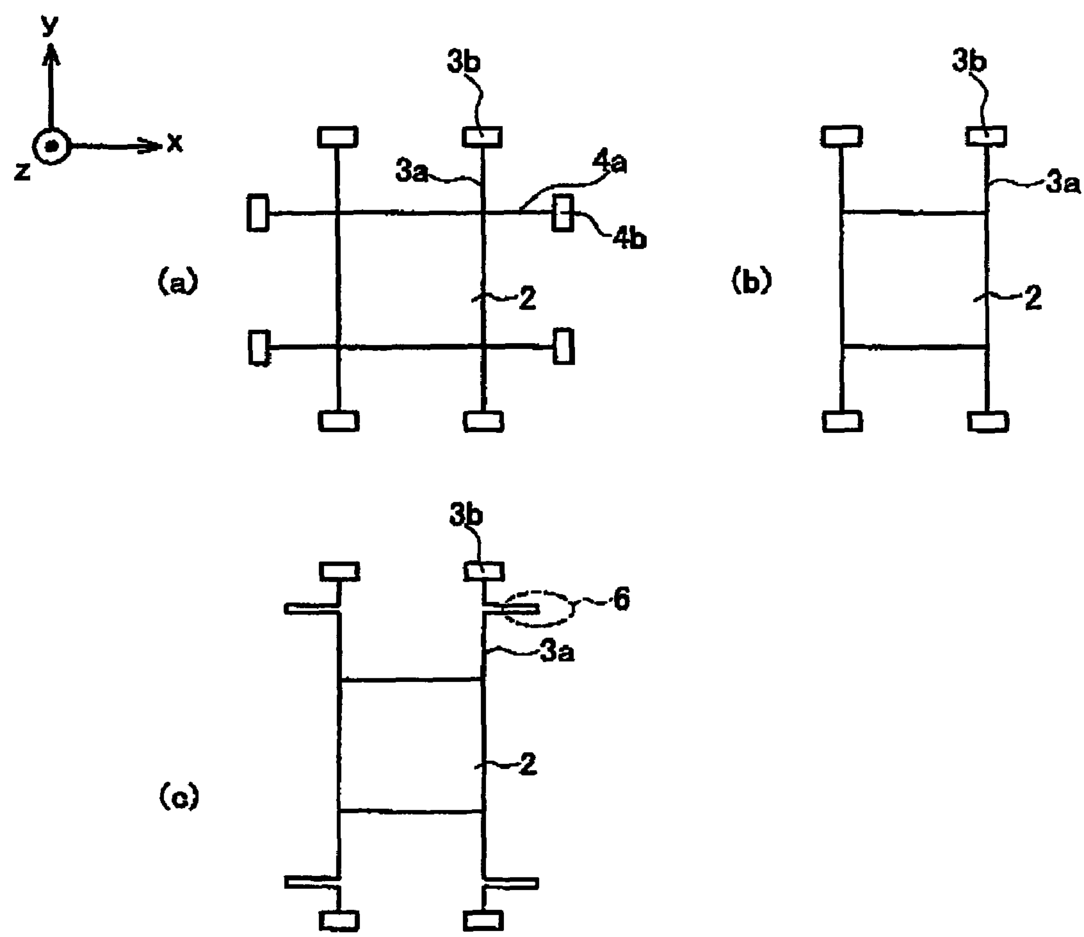
FIG. 25 (*a*), (*b*), (*c*) show variations in beam structure.

FIG. 25 (*a*) schematically shows a mass 2 and beams supporting the mass 2. The beams extend from corners of the mass 2 and comprises a y direction beam 3*a* extending in the y direction, and an x direction beam 4*a* extending in the x direction. The beams 3*a* and 4*a* are fixed to a peripheral base by means of fixing portions (3*b* and 4*b*). In this example, the mass 2 is prevented from being displaced in the x-y direction, and can be displaced only in the z direction.

FIG. 25 (*b*) shows an example in which only the y beam 3*a* is provided. In this example, the mass 2 is prevented from being displaced in the y direction, but can be displaced in the x direction and z direction. By this means, a two-direction displacement sensor can be configured capable of simultaneously measuring acceleration in the x direction and z direction. This can, for example, be applied to each of the embodiments described in the present specification which detect displacement in the z direction, and the conventional technique can be applied to detect displacement in the x direction.

FIG. 25 (*c*) shows an example in which a bending portion 6 that bends in the x direction is provided in a portion of the y beam 3*a*. In this example, the bending portion 6 allows the mass 2 to be displaced in the y direction as well. Consequently, a displacement sensor can be configured capable of simultaneously measuring acceleration in three directions.

In the case of the aforementioned displacement sensor that measure acceleration in a plurality of directions, a configuration is preferred in which a controlling region prevents the mass from being displaced. This prevents the situation in which, when the mass is displaced in one direction, the degree of displacement in another direction is affected. Accurate measurements can thus be realized.

Seventh Embodiment

Figure 26:
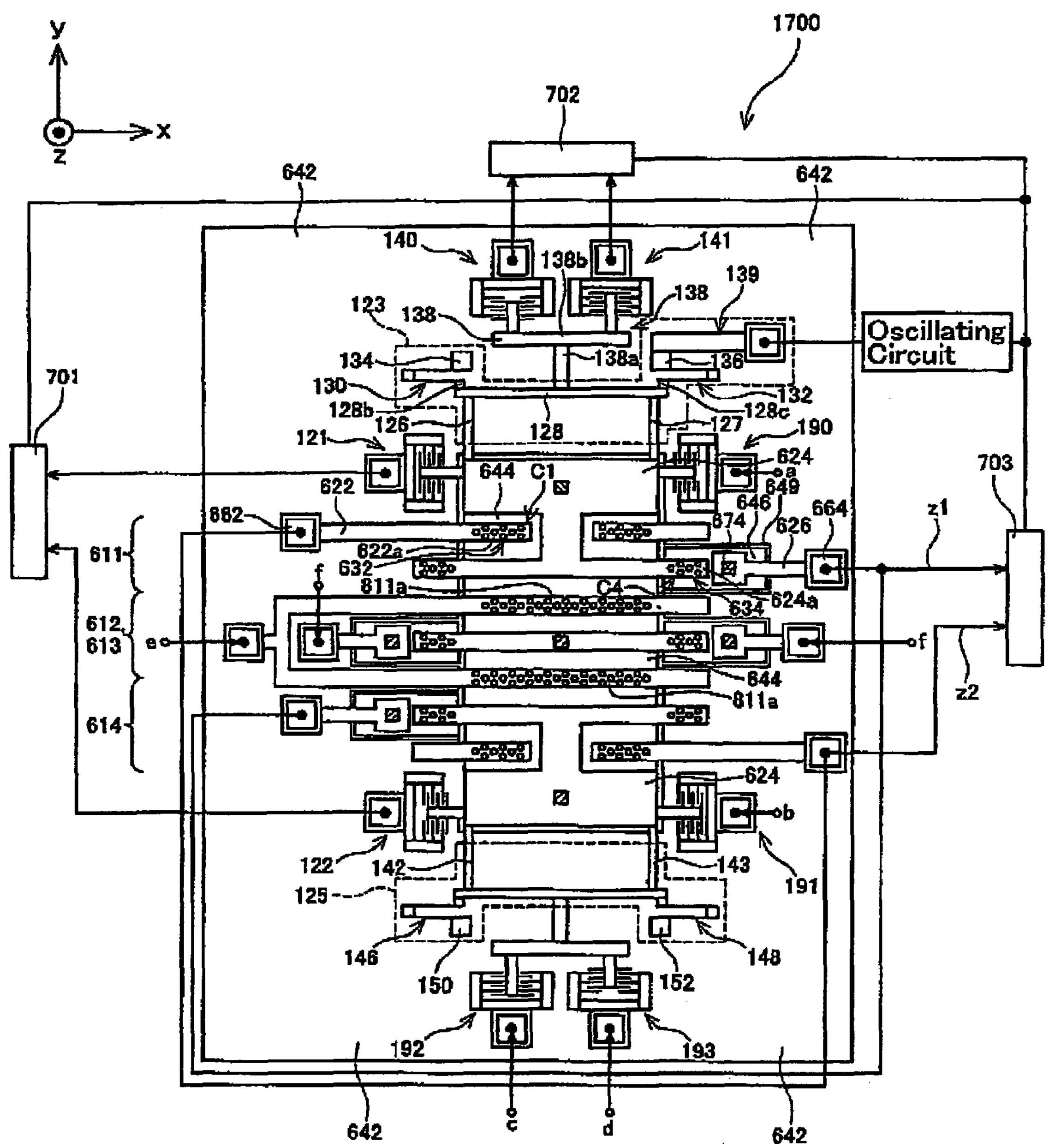
FIG. 26 shows a schematic plan view of an acceleration sensor of a seventh embodiment.

FIG. 26 shows an acceleration sensor 1700 capable of measuring acceleration in three directions. FIG. 26 schematically shows a plan view of the acceleration sensor 1700.

One characteristic of the acceleration sensor 1700 is symmetry. Since the mass is also symmetrical, the mass can be displaced in a well-balanced manner when acceleration is applied. It is thus possible to realize measure acceleration accurately.

First, the configuration for detecting acceleration in the z direction will be described with reference to FIG. 26. The configuration of the acceleration sensor 1700 for detecting acceleration in the z direction uses the configuration of the acceleration sensor 1600 of the sixth embodiment, although this configuration is modified to make it symmetrical.

A region 611 is a z direction first detecting region for detecting acceleration applied in the z direction (this region corresponds to the detecting region 311 of the sixth embodiment). The z direction first detecting region 611 is provided with a z direction first detecting electrode 662, a first upper portion 622, and a first extending portion 622*a*. The first extending portion 622*a* is opposite a first lower region 644 and is separated therefrom by a first space 632. Furthermore, the z direction first detecting region 611 is provided with a second upper portion 624 and a second extending portion 624*a*. The second extending portion 624*a* is opposite a second opposing lower region 646 and is separated therefrom by a second space 634. The second opposing lower region 646 is electrically connected with a z direction second detecting electrode 664 via a second inserted electrode 674 and an extending electrode 626.

Electrostatic capacity of the first space 632 and the second space 634 changes such that positive and negative are inverted when acceleration has been applied in the z direction. Further, a dummy structure is formed with a positional relationship that is symmetrical relative to the left-right direction of the page so that the structure forming the first space 632 remains symmetrical in the left-right direction. Moreover, a dummy structure is formed with a positional relationship that is symmetrical relative to the left-right direction of the page so that the structure forming the second space 634 remains symmetrical in the left-right direction. These dummy structures are not connected with any wiring such as detecting circuits, etc., and do not actually play a role in detecting acceleration.

Further, a z direction second detecting region 614 is formed is a symmetrical position with respect to the z direction first detecting region 611, with the mass being at the center between the two. The z direction second detecting region 614 has a configuration identical with that of the z direction first detecting region 611. The mass is thus realized with an extremely symmetrical shape.

Moreover, of the detecting electrodes formed in the z direction first detecting region 611 and z direction second detecting region 614, detecting electrodes that have a symmetrical relationship are electrically connected. One set of detecting electrodes with a symmetrical relationship are input to a z direction capacity detecting circuit 703 via wiring z1. The other set of symmetrical detecting electrodes are input to the z direction capacity detecting circuit 703 via wiring z2. By this means, acceleration applied in the z direction can be detected by means of differentiation.

612 and 613 are z direction controlling regions. The z direction controlling regions 612 and 613 have a configuration identical with that of the controlling regions 312 and 313 of the acceleration sensor 1600 of the sixth embodiment. In the present embodiment, however, two third extending portions 811*a* that intersect the first lower region 644 are formed, these being upper and lower relative to the page. This modification maintains the symmetry of the present embodiment.

Next, the configuration for detecting acceleration in the x direction and the y direction will be described using FIG. 26.

The acceleration sensor 1700 is provided with: an upper beam unit 123 connected with the second upper portion 624 at an upper side relative to the page, a lower beam unit 125 connected with the second upper portion 624 at a lower side, two x direction detecting electrode members 121 and 122 connected with the second upper portion 624 at a left side, and two x direction controlling electrodes 190 and 191 connected with the second upper portion 624 at a right side. The lower beam unit 125 and the upper beam unit 123 have an approximately identical structure. The x direction detecting electrode members 121 and 122 and the x direction controlling electrodes 190 and 191 have an approximately identical structure. This maintains the symmetry of the present embodiment.

The upper beam unit 123 is provided with two fixing portions 134 and 136, two bent beams 130 and 132, two straight beams 126 and 127, and a beam connecting plate 128. The upper beam unit 123 is formed using a conductive upper layer. An insulating layer between the upper beam unit 123 and a conductive lower layer is removed, with the exception of the fixing portions 134 and 136. These can be formed using the etching technique. High frequency can be applied from an oscillating circuit to the fixing portion 136 via an oscillating circuit electrode member 139.

Each of the bent beams 130 and 132 is formed from an outward beam portion and a returning beam portion that extends parallel to the x direction. Each of these portions is approximately identical in length and width. The outward beam and the returning beam are joined by a wide connecting portion. The bent beams 130 and 132 have low rigidity, and are capable of shifting position in the y direction. Further, the lower beam unit 125 has similar bent beams. Consequently, the lower beam unit 125 can work in conjunction with the upper bent beams 130 and 132 to displace the mass in the y direction.

The straight beams 126 and 127 are long and narrow beams that extend in the y direction. An approximately square auxiliary plate 128*b* is formed at one end of the beam connecting plate 128 and an approximately square auxiliary plate 128*c* is formed at the other end thereof. The beam connecting plate 128 is connected with the bent beams 130 and 132 via these auxiliary plates 128*b* and 128*c*. One end of each of the straight beams 126 and 127 is connected with one of the two ends of a lower side of the beam connecting plate 128. The other end of the straight beams 126 and 127 is connected with the second upper portion 624.

In this manner, the bent beams 130 and 132 and the straight beams 126 and 127 are connected respectively with the upper and lower sides of both ends of the long beam connecting plate 128 extending in the x direction. Further, the other end of the straight beams 126 and 127 is connected with the second upper portion 624. By this means the mass is firmly supported, and can be displaced stably and with little blurring.

An electrode connecting member 138 is connected with the beam connecting plate 128 of the upper beam unit 123. Two y direction detecting electrode members 140 and 141 are connected with the electrode connecting member 138. Similarly, y direction controlling electrodes 192 and 193 are formed at the lower beam unit.

Figure 27:
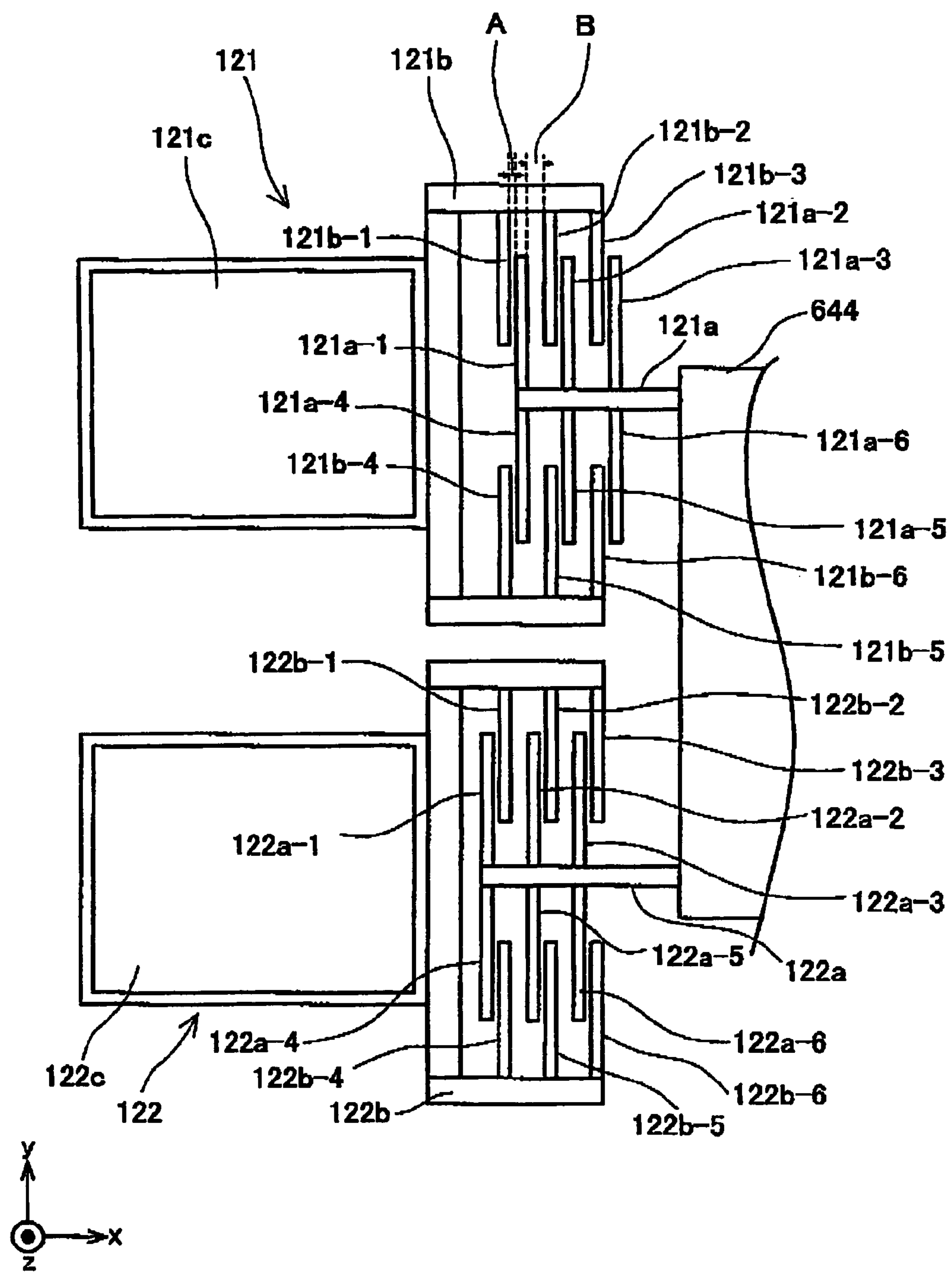
FIG. 27 shows an enlarged plan view of an x direction detecting electrode member of the seventh embodiment.

FIG. 27 shows an enlarged plan view of the x direction detecting electrode members 121 and 122. In fact, z direction controlling regions 612 and 613 are formed between the x direction detecting electrode members 121 and 122 respectively. However, for the sake of convenience, these have been omitted in the enlarged plan view.

The x direction detecting electrode members 121 and 122 are provided with movable electrodes 121*a* and 122*a*, fixed electrodes 121*b* and 122*b*, and fixed electrode terminals 121*c* and 122*c*. The movable electrodes 121*a* and 122*a* and the fixed electrodes 121*b* and 122*b* are formed by processing the conductive upper layer using an etching technique. The movable electrodes 121*a* and 122*a* are connected with the first lower region 644. The insulating layer is removed between the movable electrodes 121*a* and 122*a* and the second lower region 642. The movable electrodes 121*a* and 122*a* are formed above the second lower region 642 and are not in contact therewith. The fixed electrode terminals 121*c* and 122*c* are fixed on the second lower region 642 via the insulating layer. The fixed electrodes 121*b* and 122*b* are fixed to the fixed electrode terminals 121*c* and 122*c*.

The movable electrode 121*a* of the x direction detecting electrode member 121 is provided with six movable electrode fingers 121*a*-1 to 121*a*-6. The movable electrode fingers 121*a*-1 to 121*a*-6 are aligned equidistantly in sets of two in the x direction. Each of the movable electrode fingers 121*a*-1 to 121*a*-6 extends away from the center, and away from one another, in the y direction. The fixed electrode 121*b* is provided with six fixed electrode fingers 121*b*-1 to 121*b*-6. The fixed electrode fingers 121*b*-1 to 121*b*-6 are aligned equidistantly in sets of two in the x direction. Each of the fixed electrode fingers 121*b*-1 to 121*b*-6 extends from outer sides, and towards one another, in the y direction.

The movable electrode fingers 121*a*-1 to 121*a*-3 that extend towards a positive end of the y direction of the movable electrode 121*a*, and the fixed electrode fingers 121*b*-I to 121*b*-3 that extend towards a negative end of the y direction of the fixed electrode 121*b* are disposed such that they are interleaved. The movable electrode fingers 121*a*-4 to 121*a*-6 that extend towards a negative end in the y direction of the movable electrode 121*a*, and the fixed electrode fingers 121*b*-4 to 121*b*-6 that extend towards a positive end in the y direction of the fixed electrode 121*b* are disposed such that they are interleaved.

As shown in FIG. 27, the x direction detecting electrode member 122 is configured in a similar manner to the aforementioned x direction detecting electrode 121. However, with the upper movable electrode 121*a*, a movable electrode finger 121*a*-*n* at an nth position from the left (hereafter, this will be abbreviated to the nth from the left) is located further to the right than a fixed electrode finger 121*b*-*n* of the fixed electrode 121*b*. By contrast, the movable electrode finger 122*a*-*n* of the lower movable electrode 122*a* is located further to the left than a fixed electrode finger 122*b*-*n* of the fixed electrode 122*b*.

As a result, if the mass is displaced, for example, towards the negative end of the x direction, distance decreases between the movable electrode finger 121*a*-*n* and the fixed electrode finger 121*b*-*n*. By contrast, distance increases between the movable electrode finger 122*a*-*n* and the fixed electrode finger 122*b*-*n*. That is, the two x direction detecting electrode members 121 and 122 have a structure that is mutually complementary.

Further, as shown in FIG. 27, the distance (A in the figure) between the movable electrode finger 121*a*-*n* of the movable electrode 121*a* and the fixed electrode finger 121*b*-*n* of the fixed electrode 121*b* is narrower than the distance (B in the figure) between the movable electrode finger 121*a*-*n* of the movable electrode 121*a* and the fixed electrode finger 121*b*-(n+1) of the fixed electrode 121*b*. That is, the distance differs between the movable electrode finger 121*a*-*n* and the two adjacent fixed electrode fingers 121*b*-*n* and 121*b*-(n+1).

As a result, the electrostatic capacity between the movable electrode 121*a* and the fixed electrode 121*b* can be considered to be determined only by the sum of the electrostatic capacity between the movable electrode finger 121*a*-*n* and the fixed electrode finger 121*b*-*n*.

By this means, acceleration in the x direction can be detected by means of differentiation of the mutually complementary x direction detecting electrode members 121 and 122.

The movable electrodes 122*a* and 122*a* of the x direction detecting electrode members 121 and 122 are connected with the first lower region 644 that is capable of being displaced in the x direction and the y direction. Consequently, the movable electrodes 121*a* and 122*a* can be displaced in not just the x direction, but also the y direction.

However, if the movable electrode 121*a* is displaced towards the positive end of the y direction, there is an increase in the opposing area of the electrode fingers 121*a*-1, 121*a*-2, and 121*a*-3 of the movable electrode 121*a*, and the electrode fingers 121*b*-1, 121*b*-2, and 121*b*-3 of the fixed electrode 121*b* (see FIG. 27). By contrast, there is a decrease in the opposing area of the electrode fingers 121*a*-4, 121*a*-5, and 121*a*-6 of the movable electrode 121*a*, and the electrode fingers 121*b*-4, 121*b*-5, and 121*b*-6 of the fixed electrode 121*b*. This decrease is commensurate with the aforementioned increase in area.

Seen as a whole, therefore, the opposing area of the electrode fingers of the movable electrode 121*a* and the fixed electrode 121*b* is constant. That is, in principle, a configuration is obtained in which the displacement of the mass in the y direction, when acceleration in the y direction is applied, does not affect the output of the x direction detecting electrode member 121. The same is true for the lower x direction detecting electrode member 122.

Next, a description will be given relating to the y direction detecting electrode members 140 and 141. As shown in FIG. 26, the T-shaped electrode connecting member 138 is connected with a center of an upper side of the beam connecting plate 128 of the upper beam unit 123. The electrode connecting member 138 consists of a long first connecting bar 138*a* extending in the y direction, and a long second connecting bar 138*b* connected with one edge of the first connecting bar 138*a* and extending in the x direction. Each of the y direction detecting electrode members 140 and 141 is connected with, respectively, one of two ends of an upper face of the second connecting bar 138*b*. The two y direction detecting electrode members 140 and 141 have a configuration similar to that of the aforementioned x direction detecting electrode members 121 and 122, and can detect acceleration in the y direction by means of differentiation.

Figure 28:
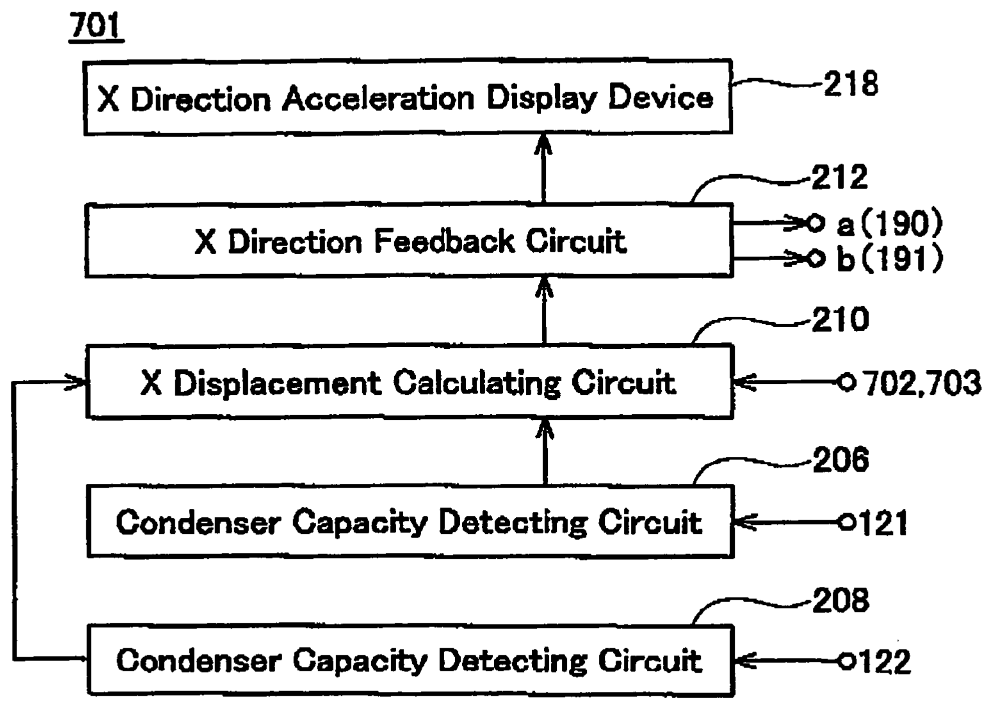
FIG. 28 shows the configuration of an x direction detecting circuit.
Figure 29:
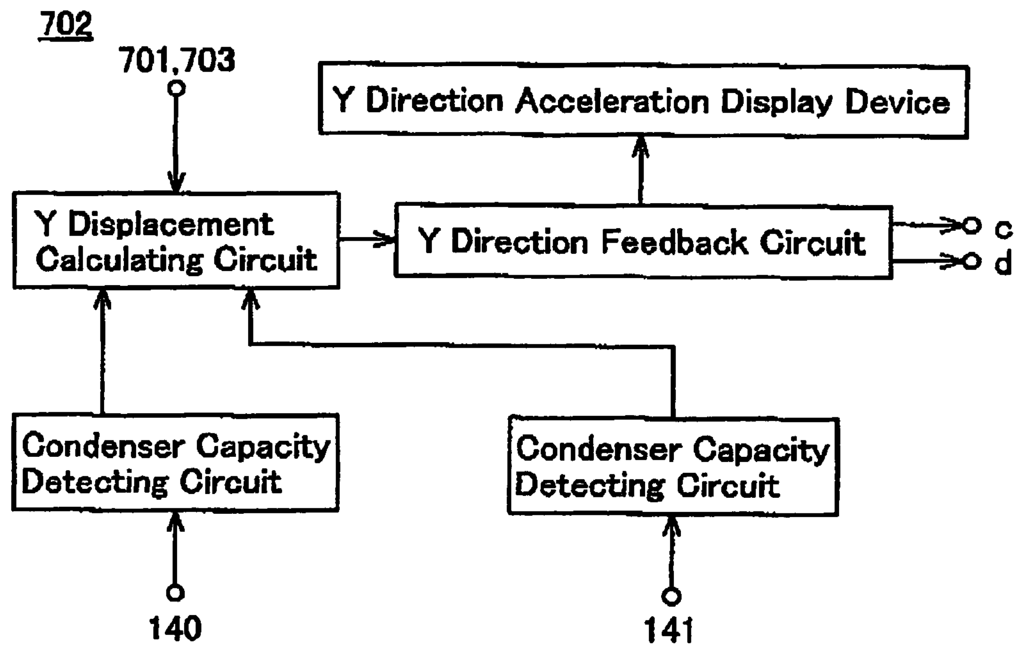
FIG. 29 shows the configuration of a y direction detecting circuit.
Figure 30:
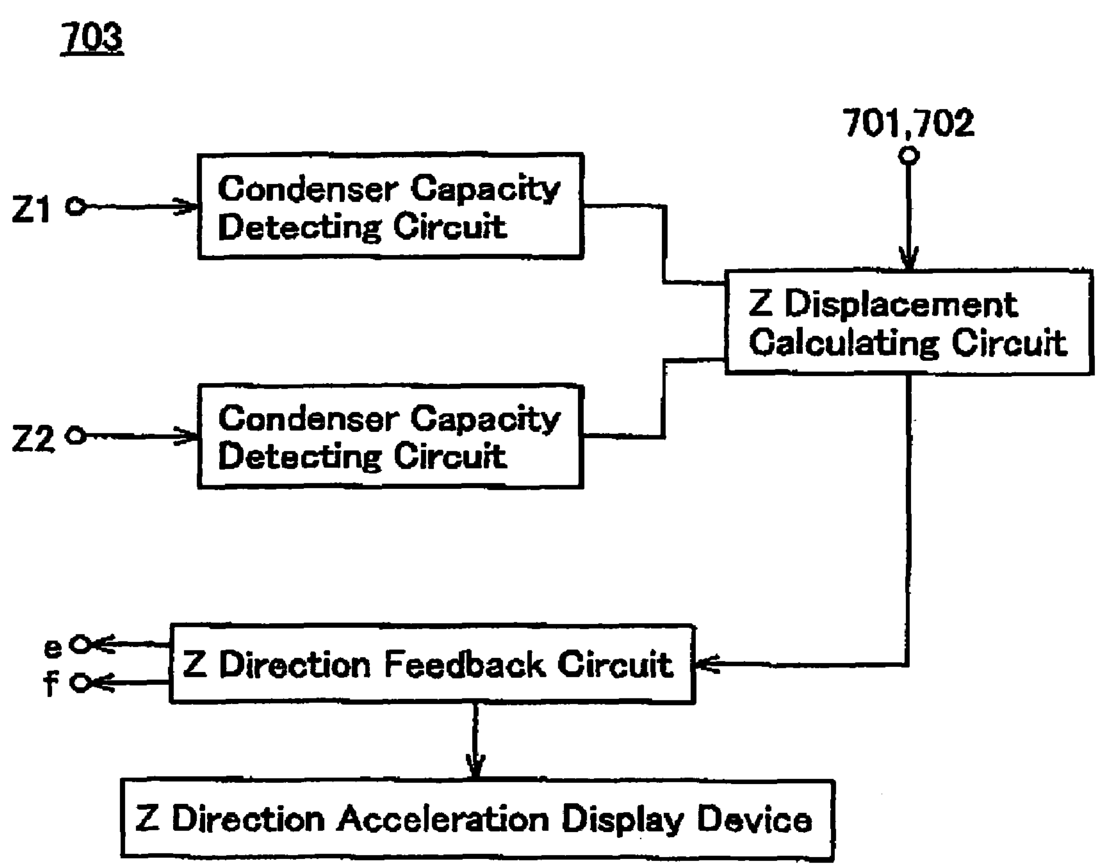
FIG. 30 shows the configuration of a z direction detecting circuit.

Next, the detecting operation will be described of the acceleration sensor that detects acceleration in three directions. Since it is common for acceleration to be applied in which components of acceleration are realized in all three directions, this type of acceleration is premised in the following description. Acceleration in the x, y, and z directions is measured by detecting circuits 701, 702, and 703 connected respectively with the detecting electrodes of each direction. The configuration of the x direction detecting circuit 701 is shown in FIG. 28. The configuration of the y direction detecting circuit 702 is shown in FIG. 29, and the configuration of the z direction detecting circuit 703 is shown in FIG. 30. Moreover, the detecting operation in the z direction is approximately the same as in the sixth embodiment, and so a description thereof is omitted. Further, the detecting operations in the x direction and the y direction are virtually the same. Consequently only the operation for detecting acceleration in the x direction will be described here with reference to FIGS. 26 and 28.

When acceleration is applied in the x direction, bending in the x direction occurs of straight beams 126 and 127 of the upper beam unit 123, and straight beams 142 and 143 of the lower beam unit 125. This causes the first lower region 642—this being in a 'floating' state supported by the fixing portions 134 and 136 of the upper beam unit 123 and fixing portions 150 and 152 of the lower beam unit 125—to be displaced in the x direction.

When the first lower region 642 is displaced in the x direction, the distance changes between the electrode fingers of the movable electrodes 121*a* and 122*a* relative to the electrode fingers of the fixed electrodes 121*b* and 122*b*, these being of the x direction detecting electrode members 121 and 122 respectively. When the distance changes between the electrode fingers, the degree of change in electrostatic capacity caused by this change in distance is detected by condenser capacity detecting circuits 206 and 208. When the degree of change in electrostatic capacity is detected, this is input to an x displacement calculating circuit 210.

As has been above, the electrostatic capacity increases in one of the x direction detecting electrode members 121 and 122, and decreases by a commensurate quantity in the other. Consequently, the x displacement calculating circuit 210 takes the difference between the positive (or negative) change in capacity detected by the upper x direction detecting electrode member 121 and the negative (or positive) change in capacity detected by the lower x direction detecting electrode member 122, offsets effects that would adversely affect measurement, such as unwanted capacity or external noise, and detects the change in electrostatic capacity with approximately double the degree of sensitivity. Thereupon the degree of displacement of the mass is calculated on the basis of the degree of change in capacity that was detected. The degree of displacement that has been calculated is input to an x direction feedback circuit 212.

Values detected by the y direction detecting circuit 702 and the z direction detecting circuit 703 are also input to the x displacement calculating circuit 210. If required, these other values can also be used to calculate compensation for influence exerted on the x direction by displacement in the other directions.

A determined amount of voltage is applied to either of the x direction controlling electrodes 190 and 191 on the basis of the degree of displacement of the first lower region 644 that was input to the x direction feedback circuit 212. Movable electrode fingers and fixed electrode fingers of the x direction controlling electrodes 190 and 191 have a mutually complementary configuration. Consequently, when voltage is applied to one of the controlling electrodes, electrostatic attraction operates between the movable electrode fingers and the fixed electrode fingers. As a result, the first lower region 644 can be attracted in the direction in which the electrostatic attraction is operating. When voltage is applied to the other of the controlling electrodes, this operates to repel the first lower region 644.

By this means, a determined voltage can be applied to optionally either of the x direction controlling electrodes 190 and 191 on the basis of the degree of displacement that was input to the feedback circuit 212. As a result, it is possible to prevent the displacement of the first lower region 644 with respect to both the positive and negative ends of the x direction. The amount of voltage applied to the x direction controlling electrodes 190 and 191 is input to an x direction acceleration display device 218. The acceleration display device 218 calculates and displays the acceleration in the x direction that corresponds to the acceleration that was input.

A simple description will be given of the operation for detecting acceleration in the y direction. When acceleration is applied in the y direction, the mass is displaced in the y direction as a result of bending in the y direction of the bent beams 130 and 132 of the upper beam unit 123 and bent beams 146 and 148 of the lower beam unit 125. The subsequent operation is similar to the aforementioned operation for detecting acceleration in the x direction.

Using controlling regions for preventing the mass from being displaced in any of the three directions, as in the present embodiment, means that the problem is avoided whereby displacement in one direction affects displacement in another direction. It is thus possible to measure acceleration accurately.

Furthermore, the structure of the acceleration sensor 1700 of the present embodiment is symmetrical, and the structure of the mass is also symmetrical. Consequently, the mass is displaced in a well-balanced manner when acceleration is applied. It is thus possible to accurately measure the acceleration that has been applied.

Moreover, in the present embodiment, the degree of displacement of the mass calculated by the displacement calculating circuit of each direction is input to the displacement calculating circuit of the other directions. By this means, it is possible to compensate for even a slightly multi-layered degree of displacement, and consequently extremely accurate measurements of acceleration are realized.

Eighth Embodiment

Figure 31:
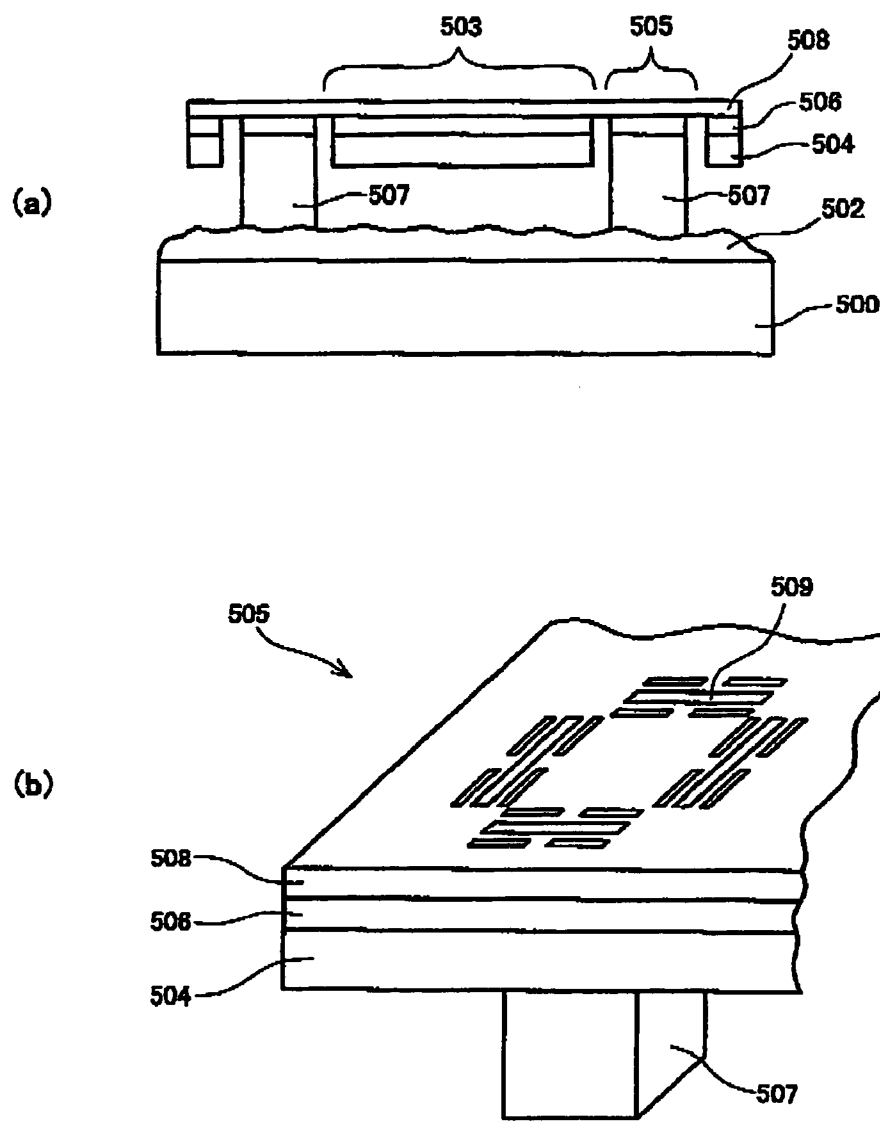
FIG. 31 (*a*) shows a cross-sectional view of a stacked structure forming an acceleration sensor that is fixed to a pedestal, FIG. 31 (*b*) shows an enlarged diagonal view of essential parts in the vicinity of a supporting column.
Figure 32:
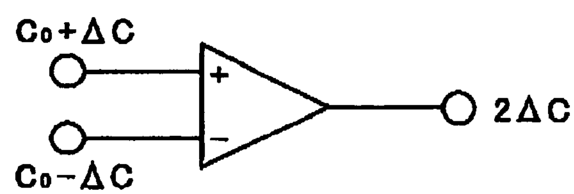
FIG. 32 shows an explanatory view of a differential sensor of prior art.

The case will be described, using FIG. 31, in which the acceleration sensor described in the first to seventh embodiments are fixed to a sensor supporting structure 500. FIG. 31

(*a*) schematically shows a cross-sectional view of essential parts, and FIG. 31 (*b*) schematically shows an enlarged diagonal view of essential parts in the vicinity of a supporting column 507.

504 is a conductive lower layer, 506 is an insulating layer, and 508 is a conductive upper layer. This is a stacked structure. The acceleration sensors described above in the first to seventh embodiments are formed in a portion 503 in FIG. 31 (*a*). A supporting column 507 extends from the conductive lower layer 504 (this corresponds to the second lower region in the above embodiments) at the periphery of the portion of 503 in which the acceleration sensor is formed. The supporting column 507 can be formed by, for example, removal by etching of an inner face of a portion of the conductive lower layer 504, with the remaining portion forming the supporting column 507. An upper end, in the direction of extension of the supporting column 507, joins with a corner portion 505 of the conductive upper layer 508. The other end of the supporting column 507 joins with the sensor supporting structure 500 via an insulating die bonded member 502. The use of this insulating die bonded member 502 electrically isolates the acceleration sensor and the sensor supporting structure 500. By this means, a desired voltage can be maintained at the acceleration sensor side, and external electrical influence can be prevented. A slit 509 that makes a loop around the supporting column 507 is formed between the supporting column 507 and the conductive lower layer 504.

As shown in FIGS. 31 (*a*) and (*b*), the slit 509 penetrates the insulating layer 506 and a portion of the conductive upper layer 508. The slit 509 that penetrates the conductive upper layer 508 does not make a loop around the conductive upper layer 508. Forming the slit 509 allows a spring structure to be provided between the corner portion 505 and the portion 503 in which the acceleration sensor is formed.

Conventionally, when a stacked structure that forms the acceleration sensor is fixed to the sensor supporting structure 500, either the stacked structure is fixed thereto while being separated therefrom by a determined distance, or there is the problem that, due to expansion of the sensor supporting structure 500, or the like, stress accumulates in the stacked structure that forms the acceleration sensor. This stress causes the beams of the acceleration sensor to expand and contract, resulting in the sensitivity of the acceleration sensor being unstable or in zero output.

Providing a spring structure between the corner portion 505 and the region 503 in which the acceleration sensor is formed, as in the present embodiment, enables a reduction in the force applied to the acceleration sensor. The described sensor characteristics are displayed even if the above situation has occurred. However, since the acceleration sensor is supported in an extremely soft manner due to the slit 509, errors in the quantity of acceleration output by the acceleration sensor and errors in phase can occur. To avoid this, it is desirable, for example, that resonance frequency—this being determined on the basis of a spring constant specified by the shape of the slit 509 and on the basis of mass of the region 503 in which the acceleration sensor is formed—is set to be at least double the resonance frequency of the acceleration sensor. This can reduce the effects on sensor characteristics.

It is also possible, for example, to form a groove in a portion of the sensor supporting structure, and to dispose the acceleration sensor above this groove instead of having the embodiment described above. In this case, the sensor supporting structure outside the groove and the stacked structure that forms the acceleration sensor are connected. The two may be fixed together using an insulating die bonded member, or may be bonded via an insulating layer. The sensor supporting structure and the acceleration sensor are electrically isolated, and consequently external electrical influence can be prevented.

Specific examples of the present invention are described above in detail, but those examples are merely illustrative and place no limitation on the patent claims. The technology described in the patent claims also includes changes and modifications to the specific examples described above.

Furthermore, the technological features explained in the specification or appended drawings demonstrate their technological utility when used alone or in a variety of combinations thereof and are not limited to the combinations described in the patent claims at the time of filing of the application. Furthermore, the technology illustrated by the specification or appended drawings can attain multiple objects at the same time, and attaining one of those objects has by itself a technological utility.

The invention claimed is:

1. A displacement sensor comprising:

a conductive lower layer divided into a first lower region and a second lower region by a groove penetrating the conductive lower layer;

an insulating layer stacked on the conductive lower layer at selected portions;

a first upper portion of a conductive upper layer, the first upper portion extending from a position above the first lower region to a position above the second lower region, and a beam connecting the first lower region and the second lower region;

wherein a space is formed between the first upper portion and the first lower region, and the insulating layer is formed between the first upper portion and the second lower region, and a first condenser is formed by the first upper portion and the first lower region that are separated by the space.

2. A displacement sensor of claim 1, wherein:

the conductive upper layer further has a second upper portion forming one of electrodes of a second condenser, the second upper portion extending from a position above the first lower region to a position above the second lower region;

wherein the insulating layer is formed between the second upper portion and the first lower region, and a space is formed between the second upper portion and the second lower region;

whereby when relative displacement occurs in a stacked direction between the first lower region and the second lower region, distance between the electrodes of the first condenser increases, and distance between the electrodes of the second condenser decreases.

3. A displacement sensor of claim 2, wherein:

the first lower region is surrounded by the second lower region, and a portion of the second lower region opposite the second upper portion is electrically isolated from a remaining portion of the second lower region.

4. A displacement sensor of claim 3, wherein:

the insulating layer and the conductive upper layer are stacked on a portion of a surface face of the first lower region, and a portion of the insulating layer is removed so that the first lower region and the conductive upper layer stacked on the first lower region are electrically connected, wherein the first upper portion, the conductive upper layer stacked on the first lower region, and the second lower region are each connected with a condenser capacity detecting circuit.

5. A displacement sensor of claim 1, wherein:

the beam is formed from the conductive upper layer, and each of two ends of the beam is connected, via the insulating layer, with the first lower region and the second lower region respectively.

6. A displacement sensor of claim 5, wherein:

a space is formed between the conductive upper layer and the conductive lower layer except for at the two ends of the beam.

7. A displacement sensor of claim 1, wherein:

the first lower region is surrounded by the second lower region, a third upper portion is formed on the conductive upper layer, the third upper portion passing above the first lower region and linking two opposing portions of the second lower region with the first lower region being interposed therebetween, wherein a space is formed between the third upper portion and the first lower region, and a fourth upper portion is formed on the conductive upper layer, the fourth upper portion being stacked on the first lower region with the insulating layer therebetween, and the fourth upper portion extending above two opposing parts of the second lower region with the first lower region being interposed therebetween, wherein a space is formed between the fourth upper portion and the second lower region.

8. A displacement sensor of claim 7, wherein:

the beam connects the first lower region and the second lower region such that the first lower region can be displaced, with respect to the second lower region, in a stacked direction and in a direction orthogonal to the stacked direction.

9. A displacement sensor of claim 1, wherein:

the first lower region is surrounded by the second lower region, and a supporting column extends from a lower face of the second lower region towards a sensor supporting structure, and a slit making a loop around the supporting column is formed between a portion of the conductive lower layer located above the extending supporting column and the remaining portion of the conductive lower layer.

* * * * *